US007017148B2

(12) United States Patent
Kumar

(10) Patent No.: US 7,017,148 B2
(45) Date of Patent: Mar. 21, 2006

(54) APPARATUS AND METHOD FOR UPNP DEVICE CODE GENERATION USING XML

(75) Inventor: Murari Kumar, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 631 days.

(21) Appl. No.: 09/903,019

(22) Filed: Jul. 10, 2001

(65) Prior Publication Data

US 2003/0093769 A1 May 15, 2003

(51) Int. Cl.
*G06F 9/44* (2006.01)

(52) U.S. Cl. ...................... 717/114; 717/121; 717/122; 717/123; 717/168; 709/223; 709/224; 710/8; 710/10; 710/15

(58) Field of Classification Search ................ 717/168, 717/174, 120–123, 140; 703/223; 709/227, 709/220, 223, 224; 707/10; 714/4; 710/8, 710/10, 15

See application file for complete search history.

(56) References Cited

U.S. PATENT DOCUMENTS

| | | | | |
|---|---|---|---|---|
| 6,549,943 | B1 * | 4/2003 | Spring | 709/223 |
| 6,789,077 | B1 * | 9/2004 | Slaughter et al. | 707/10 |
| 2002/0035621 | A1 * | 3/2002 | Zintel et al. | 709/220 |
| 2002/0112058 | A1 * | 8/2002 | Weisman et al. | 709/227 |

OTHER PUBLICATIONS

"UPnP Device Architecture", Version 1.0, Jun. 8, 2000, http://www.upnp.org/download/UPnPDA10_20000613.htm.*

"Universal Plug and Play in Windows XP" By Tom Foul, Microsoft Corporation, http://www.microsoft.com/technet/prodtechno1/winxppro/evaluate/upnxp.mspx.*

"Universal Plug and Play in Windows XP", Jul. 1, 2001, Tom Fout, http://www.microsoft.com/technet/prodtechnol/winxppro/evaluate/upnpxp.mspx.*

"UPnP Device Architecture", Jun. 8, 2000, http://www.upnp.org/download/UPnPDA10_20000613.htm.*

* cited by examiner

*Primary Examiner*—Tuan Dam
*Assistant Examiner*—Chih-Ching Chow
(74) *Attorney, Agent, or Firm*—Blakely, Sokoloff, Taylor & Zafman LLP

(57) ABSTRACT

An apparatus and method for UPnP device code generation using XML are described. The method includes receiving a UPnP device description document from a device developer. Once received, one or more service control class files are generated, including one or more service control stub-methods. Next, the service control class files are received, including updated service control stub-methods. The updated stub-methods are modified by the device developer in order to respond to actions received by a UPnP device described by the UPnP device description document. Finally, the service control class files and the updated service control stub-methods, along with a device class library and a UPnP SDK are compiled to generate a device executable for the UPnP device described by the UPnP device description document.

28 Claims, 20 Drawing Sheets

100
XML (DCP & SCPD)
104
102
UD TOOL
Class Files for Services
120
UDS
SERVICE STUB-METHOD
122
300
UDCL
400
UPnP SDK
402
Compile&Link
130
124
UPDATED STUB-METHODS
126
Device Developer
450
DEVICE
UD class Lib (UDCL)
Class Obj File
Class Obj File
Class Obj File

250

TvDevice 252

254 ServiceLinker.cpp

256 ServiceLinkder.h

258 Picture.cpp

260 Picture.h

262 Control.cpp

264 Control.h

270 /VCR

Control.cpp 272

Control.h 274

276 /include UPnP library header files and UDCL header file)

278 /lib

280 /Web (Contains all the XML file from which the code generated)

282 And other project files depending on operating system.

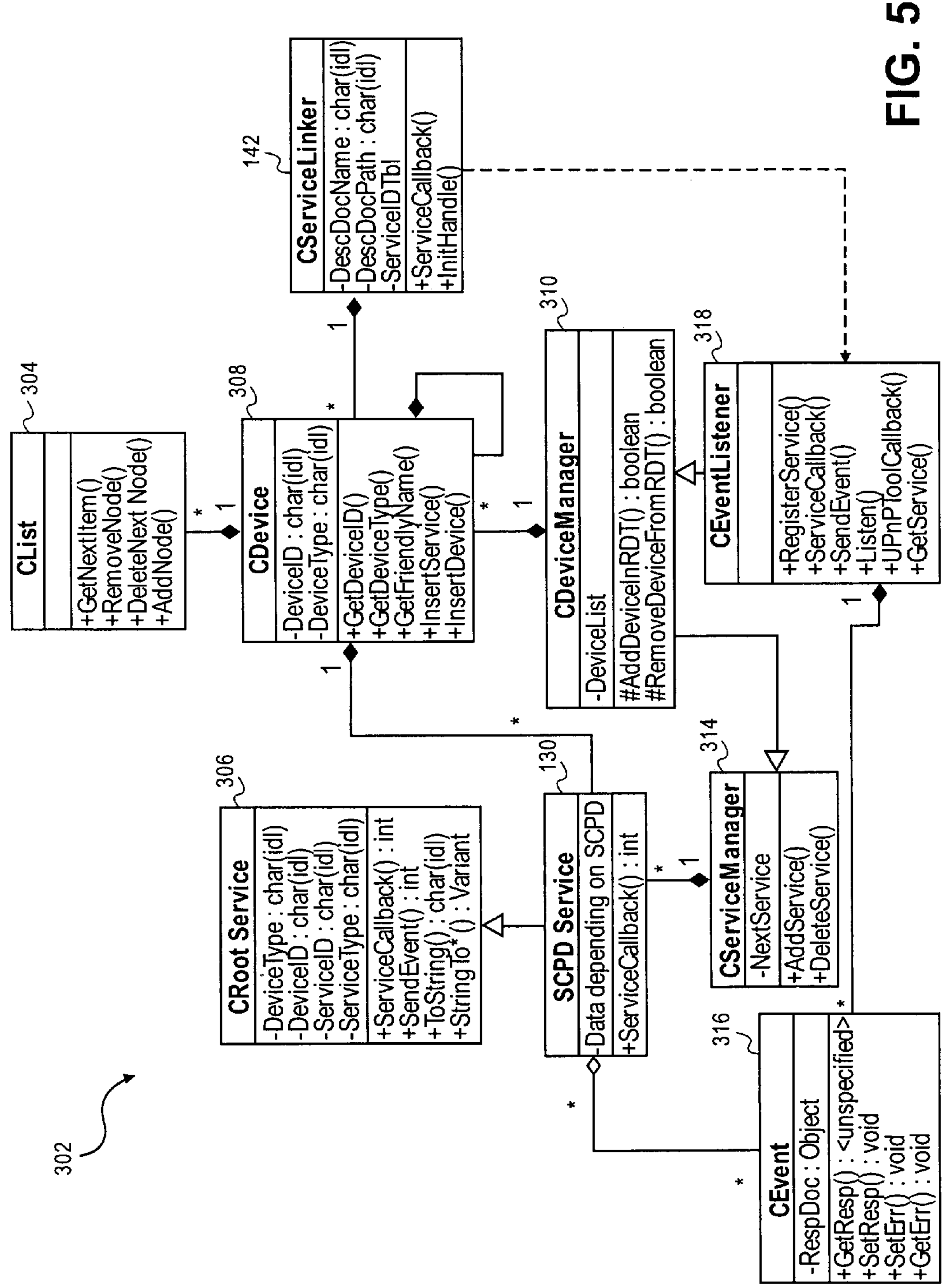
302
CList
+GetNextItem()
+RemoveNode()
+DeleteNext Node()
+AddNode()
304
CDevice
-DeviceID : char(idl)
-DeviceType : char(idl)
+GetDeviceID()
+GetDeviceType()
+GetFriendlyName()
+InsertService()
+InsertDevice()
308
CServiceLinker
-DescDocName : char(idl)
-DescDocPath : char(idl)
-ServiceIDTbl
+ServiceCallback()
+InitHandle()
142
CDeviceManager
-DeviceList
AddDeviceInRDT() : boolean
RemoveDeviceFromRDT() : boolean
310
CEventListener
+RegisterService()
+ServiceCallback()
+SendEvent()
+Listen()
+UPnPToolCallback()
+GetService()
318
CRoot Service
-DeviceType : char(idl)
-DeviceID : char(idl)
-ServiceID : char(idl)
-ServiceType : char(idl)
+ServiceCallback() : int
+SendEvent() : int
+ToString() : char(idl)
+StringTo*() : Variant
306
SCPD Service
-Data depending on SCPD
+ServiceCallback() : int
130
CServiceManager
-NextService
+AddService()
+DeleteService()
314
CEvent
-RespDoc : Object
+GetResp() : <unspecified>
+SetResp() : void
+SetErr() : void
+GetErr() : void
316
FIG. 5

APPARATUS AND METHOD FOR UPNP DEVICE CODE GENERATION USING XML

FIELD OF THE INVENTION

The invention relates generally to the field of universal plug and play devices. More particularly, the invention relates to a method and apparatus for UPnP device code generation using XML.

BACKGROUND OF THE INVENTION

The advent of Device Plug and Play (PnP) has revolutionized device integration within an operating system. Device PnP capability within an operating system makes it a great deal easier to setup, configure, and add peripherals to a PC. Universal Plug and Play (UPnP) extends device PnP capability to an entire network. Accordingly, a UPnP network enables discovery and control of devices within the UPnP network. The devices include networked devices and services, such as network-attached printers, Internet gateways, and consumer electronics equipment.

However, UPnP is more than just a simple extension of the Plug and Play peripheral model. UPnP is designed to support zero-configuration, "invisible" networking, and automatic discovery for a breadth of device categories from a wide range of vendors. Utilizing UPnP, a device can dynamically join a network, obtain an IP (Internet protocol) address, convey its capabilities, and learn about the presence and capabilities of other devices. These dynamic capabilities occur automatically, thereby truly enabling zero configuration networks. Consequently, devices within a UPnP network can communicate with each other directly to enable peer to peer networking.

The varieties of device types that can benefit from a UPnP enabled network are large and include intelligent appliances, wireless devices, and PCs of all form factors. In fact, the scope of UPnP is large enough to encompass many existing, as well as new and exciting scenarios. These new and exciting scenarios include home automation, printing and imaging, audio/video entertainment, kitchen appliances, automobile networks, and proximity networks in public venues. Moreover, UPnP uses standard TCP/IP (TransmissionControlProtocol/IP) and Internet protocols. Accordingly, UPnP device capabilities can be seamlessly fit into existing networks. Furthermore, using these standardized protocols allows UPnP to benefit from a wealth of experience and knowledge, and makes interoperability an inherent feature.

UPnP is a distributed, open network architecture, defined by the protocols used. As a result, UPnP is independent of any particular operating system, programming language, or physical medium (just like the Internet). In addition, UPnP does not specify the APIs (application programming interfaces) applications will use. As a result, operating system vendors are allowed to create the APIs that will meet their customer needs. Unfortunately an easy and quick solution for expediting the device development process does not exist.

Accordingly, UPnP device development requires a thorough understanding of UPnP, a UPnP development kit, such as Intel's UPnP SDK (software development kit), as well as XML (extensible mark-up language). In addition, the device developer is forced to repeatedly write similar code for each device implementation, with little variation. As a result, each new device requires fresh design and implementation work from scratch. Besides this, the developer has to write the code to parse XML, perform parameter conversion, handle callbacks, manage an event table, generate responses, map services, etc. Furthermore, testing time and resources are duplicated for each new device implementation. These problems become serious in a project that is time critical and requires quick deployment.

Therefore, there remains a need to overcome one or more of the limitations in the above-described existing.

BRIEF DESCRIPTION OF THE DRAWINGS

The present invention is illustrated by way of example, and not by way of limitation, in the figures of the accompanying drawings and in which:

FIG. 5 depicts a block diagram illustrating a device to be formed in accordance with the teachings of the present invention and in accordance with an embodiment of the present invention.

DETAILED DESCRIPTION

Figure 1:
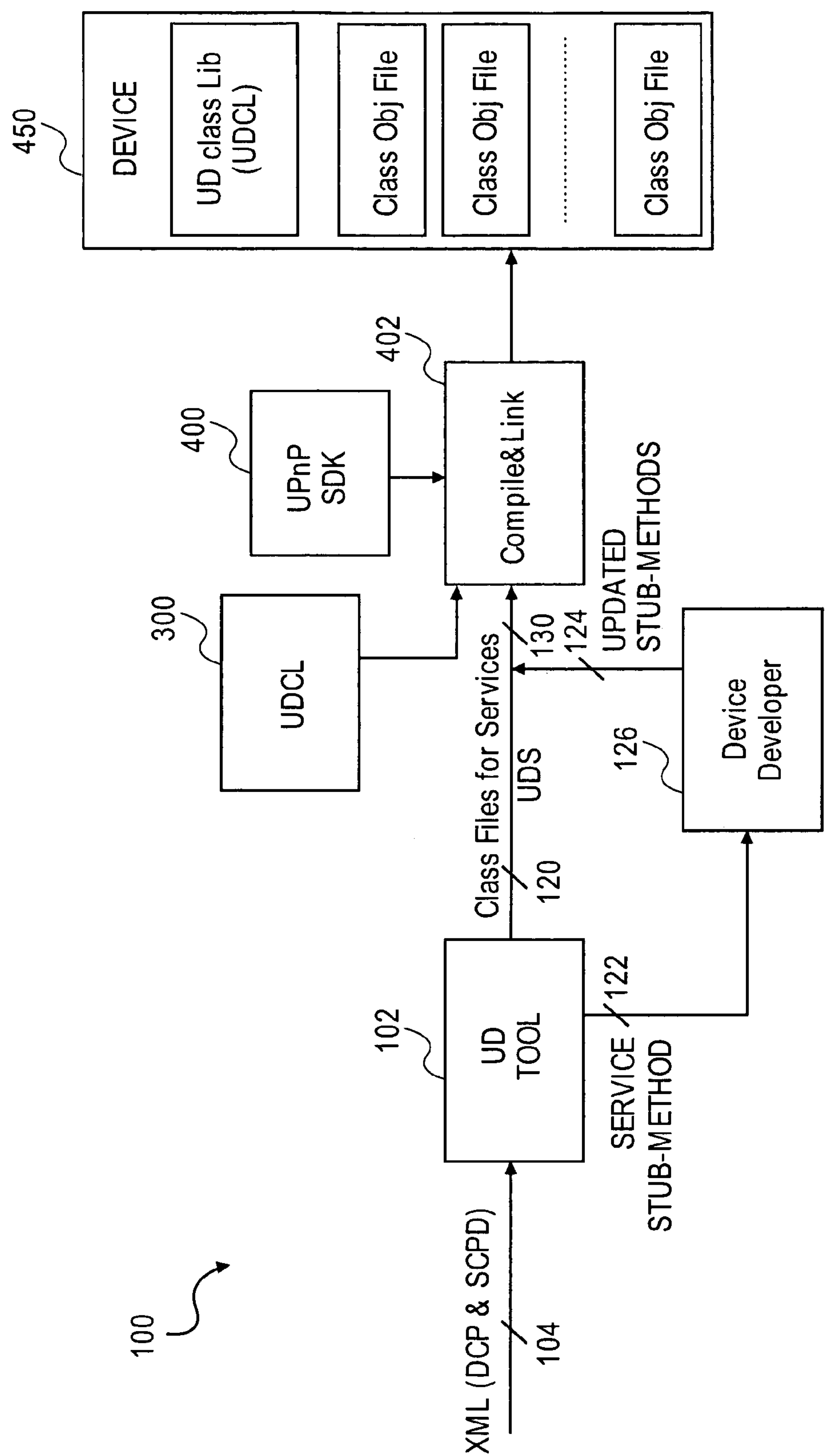
FIG. 1 depicts a block diagram illustrating components in accordance with an embodiment of the present invention in order to generate a universal plug and play (UPnP) device executable in accordance with the embodiment of the present invention.

A method and apparatus for UPnP device code generation using XML are described. The method includes receiving a universal plug and play (UPnP) device description document from a device developer. Once received, one or more service control class files are generated, which include one or more service control stub-methods. Next, the service control class files are received, including updated service control stub-methods. The updated stub-methods are modified by the device developer in order to respond to actions received by a UPnP device described by the UPnP device description document. Finally, the service control class files and the updated service control stub-methods, along with a device class library and a UPnP software developing kit (SDK) are compiled to generate a device executable for the UPnP device described by the UPnP device description document.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention.

In other instances, well-known structures and devices are shown in block diagram form in order to avoid obscuring the details of the present invention. In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine or computer-readable medium having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of computer/media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System

The present invention describes an apparatus and method for which a universal plug and play (UPnP) based device can be created from a UPnP device description document with significantly less effort than required by conventional UPnP-based device design. Referring now to FIG. 1, an apparatus 100 is composed of two modules: the universal device tool (UDT) 102 and the universal device class library (UDCL) 300. The UDT 102 provides a generic tool to generate UPnP-based device implementations. The UDT 102 provides separate class templates as output code (UDS) for each service listed in the UPnP device description document. The UDS output code 120 generated by the UDT 102 includes service control stub-methods 122, which are provided to a device developer 126.

As will be described in further detail below, the service control stub-methods 122 provide template code for responding to actions and events encountered by a UPnP device described by the UPnP device description document 104. Accordingly, once updated by a device developer 126, the updated stub-methods 124 are combined with the UDS output code 120 to form updated UDS output code 130, which can then be compiled and linked with the UDCL 300, as well as a UPnP software development kit (SDK) 400 in order to generate a device executable 450 for the UPnP device described by the device description document 104. Accordingly, the device executable 450 is designed to provide operating system (OS) independent UPnP service code.

Figure 2:
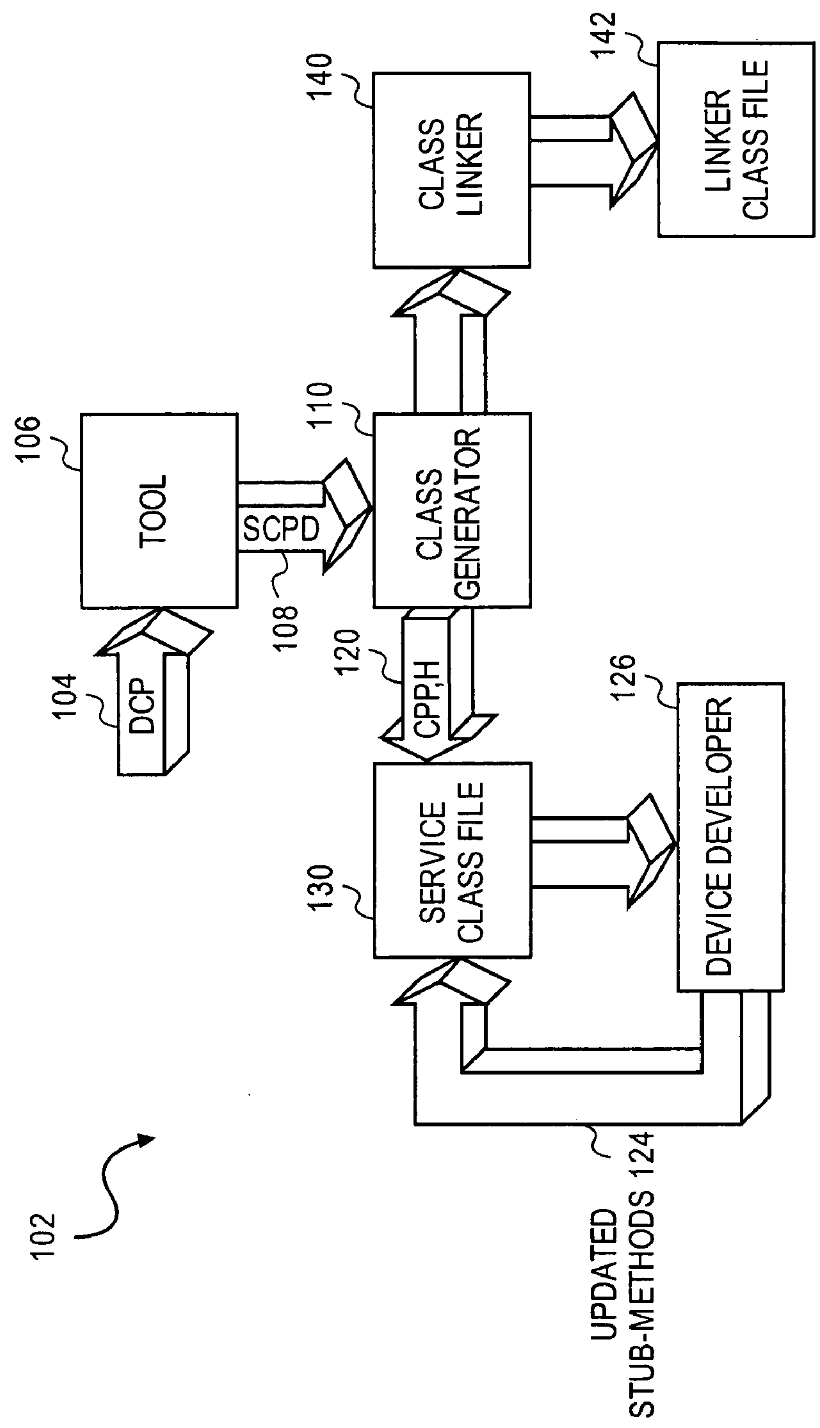
FIG. 2 depicts a block diagram illustrating components of a universal device tool in accordance with a further embodiment of the present invention.

Referring now to FIG. 2, FIG. 2 further illustrates the UDT 102 in accordance with an embodiment of the present invention. As will be described in further detail below, the UDT 102 is an extensible mark-up language (XML) parser that takes, for example, an input XML file and generates one or more class files, such as for example C++ class files. The UDT output code 120 creates service-specific classes that include code to process UPnP events, parse XML packets, perform parameter conversion and also enable creating and sending response packets.

Referring again to FIG. 2, the UDT 102 includes a tool 106 (see CUdTool 156, FIG. 3), which receives the device description document 104, which in one embodiment is a device-control protocol description document (DCP), including links to one or more service control protocol description files. Once received, the tool 106 parses the description file 104 in order to ascertain a root device and various embedded devices described by the description document 104. In addition, the tool also ascertains the services, the service identification codes and device identification codes (ID) of the various devices described by the document 104. Once determined, the tool 106 passes the determined device IDs, service IDs and relevant service control protocol description documents (SCPD) to the class generator 110 (see CClassGenerator 158, FIG. 3). Accordingly, the class generator 110 takes the required parameters, such as the SCPD file 108, the device and service IDs, and creates a service-specific set of classes for all services found in the root device, as well as services for any embedded devices to generate the UDS output code 120.

Figure 3:
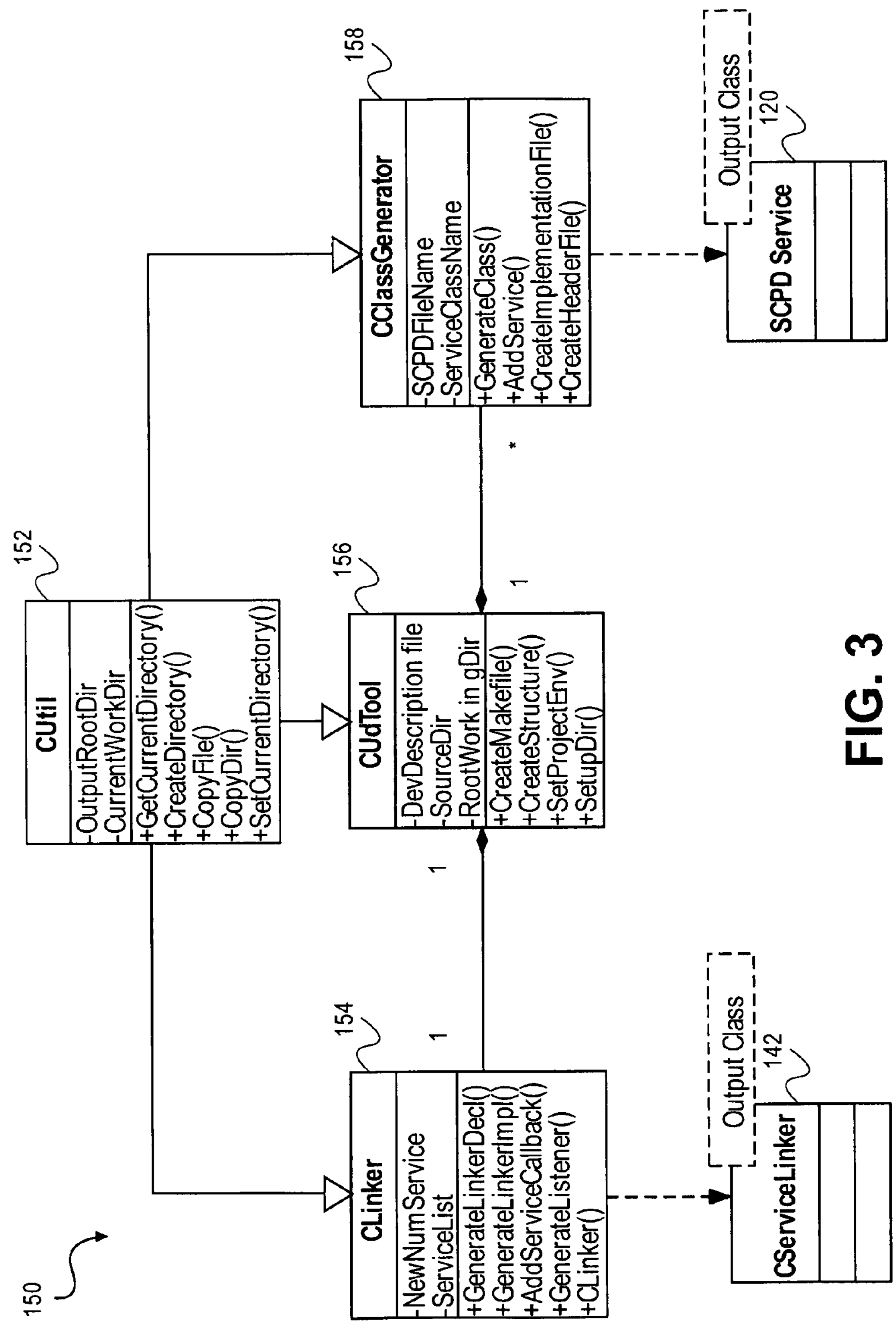
FIG. 3 depicts a block diagram illustrating a universal device tool (UDT) class description hierarchy in accordance with a further embodiment of the present invention.

Once the class generator has created the service class 120, details of the classes are passed to a class linker 140 (see CLinker 154, FIG. 3). The class linker 140 keeps track of all service class files 130 generated for the device. As such, each time the class generator 110 generates a new class, the class linker 140 adds its information in its service list table. Finally, the class linker 140 generates a service linker class file 142 for the entire device. The service linker class keeps all details of each service class and its parent device. Moreover, the class generator 110 generates the code that creates the necessary device hierarchy for the root device. The root device is first generated by the service linker and is then registered with an event listener class, which, as described in further detail below, is part of the UDCL.

Referring now to FIG. 3, FIG. 3 depicts a class hierarchy for the classes utilized by the UDT 102. In one embodiment, the UDT 102 is composed of four different classes. The CUtil 152 works as a base class for the remaining classes. In the embodiment described, common utility methods and data types utilized by the UDT 102 are abstracted into the CUtil class 152. A CUdTool class works as a main component of the UDT system 102 by driving the entire operation of UDS code generation 120. CUdTool 152 creates a class generator object for each service found in the device description document 104 and also passes the required parameters necessary for class generation.

Once the respective service class is generated by the class generator 158, the CUdTool 156 passes this class information to the class linker 140. In one embodiment the CUdTool 156 creates an instance of the CLinker class 154 in order to perform the functionality of the class linker 140. In contrast, the CUdTool 156 creates an instance of class generator for each service described by the UPnP device description document 104, which is destroyed once class generation of the respective service is complete. Accordingly, once service class generation is complete, the CLinker objects collects the relevant class information in its service table and creates the service linker class file (CServiceLinker) 142.

Figures 4A, 4C:
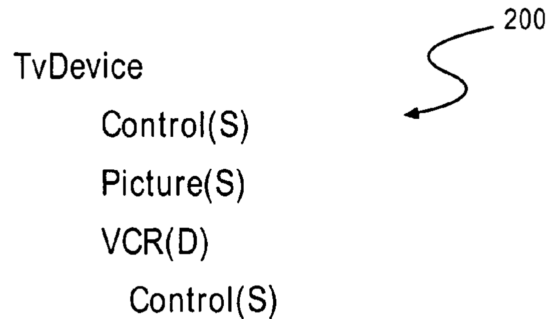
FIG. 4A depicts a UPnP device description document in accordance with an embodiment of the present invention.
FIG. 4C depicts generated code and directories created as described in FIG. 4B in accordance with a further embodiment of the present invention.

Referring now to FIG. 4A, FIG. 4A depicts a sample device description document 200. Although device description documents are generally provided in XML format, the document 200 is not depicted in XML format in order to avoid obscuring the details of the present invention. The device description document 200 describes a television (TV) device with various controls, as well as an embedded VCR devices. The device description document 200, once passed to the UDT 104, will generate the following sequences of operation, as depicted with reference to FIG. 4B. As depicted with reference to FIG. 4B, an instance of the CUdTool 156 will create a root directory for the UPnP device 252, which, in the embodiment described, is a TV device 252. Next, the CUdTool 156 will pass control service information 108, which results in the creation of a CClassGenerator 230. Next, the CClassGenerator 230 creates a service control class and corresponding header file 224. Next, the relevant class information 236 is provided to an instance of the CLinker class 154.

The service control class generation is repeated when the CUdTool 156 passes picture service control information 108 to the class generation 110, which results in generation of a new CClassGenerator 232. The new CClassGenerator creates service control class files for the picture service 226. Next, C-picture class information 240 is passed to the CLinker object 154. Finally, the CUdTool 156 creates a directory for embedded device VCR 270. Once generated, the CUdTool 156 passes control service information, which results in the generation of a new CClassGenerator 234. The CClassGenerator next creates control information service classes and corresponding header files 244. Once generated, CControl class information is passed back to the CLinker. Finally, the CLinker object 154 generates the service linker class file 142 and corresponding header file.

Figure 4B:
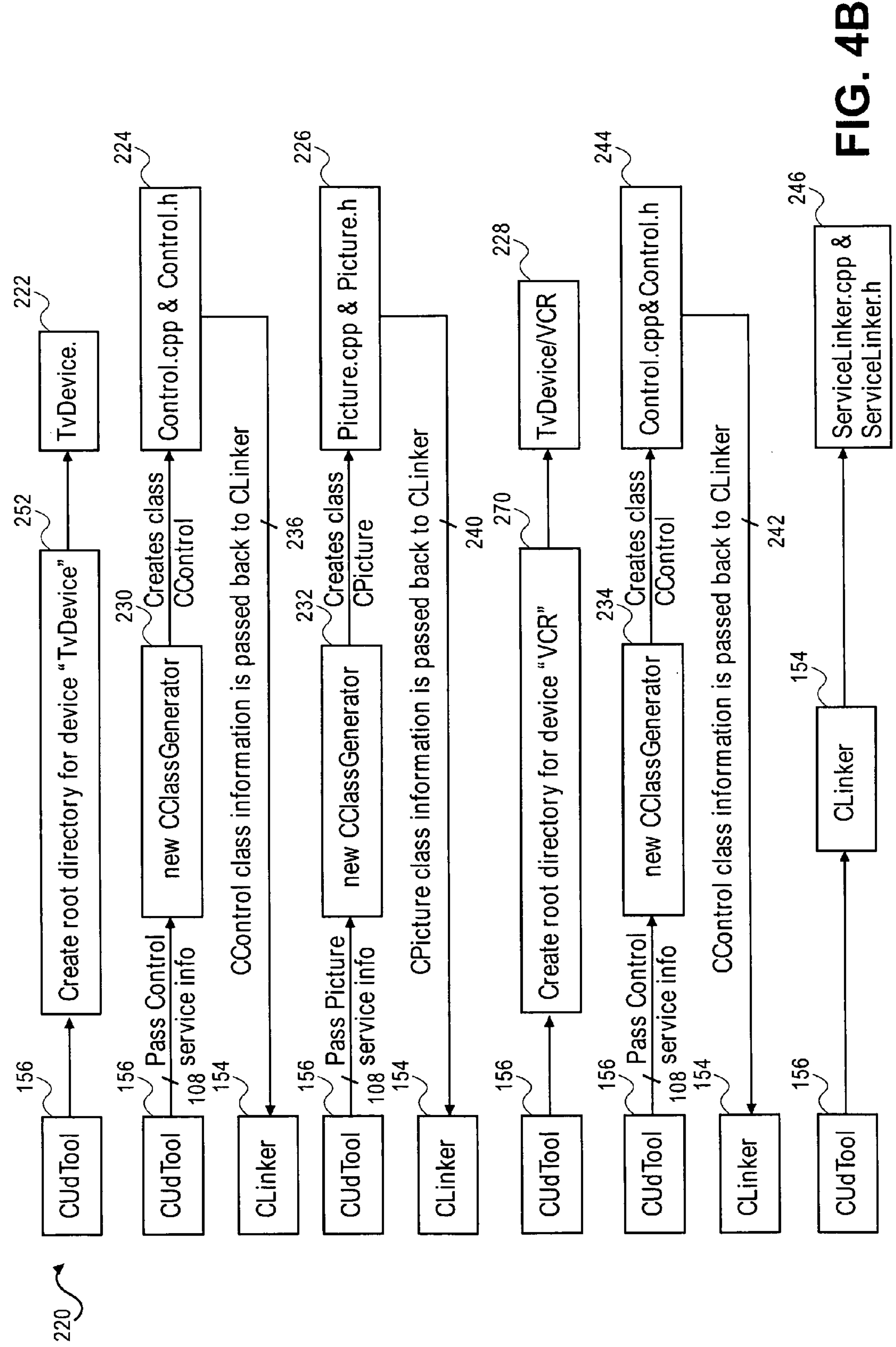
FIG. 4B depicts a block diagram illustrating functionality performed by the universal device tool in accordance with the embodiment of the present invention.

Accordingly, referring to FIG. 4C, FIG. 4C depicts UDS output code 120 and directory information generated by the process described with reference to FIG. 4B As illustrated, the directory information includes the root device 252, including corresponding service control class files and corresponding header files. In addition, the directory includes a sub-root directory for the embedded device VCR 270, as well as service control class files and corresponding header files. In addition, the CUdTool 104 may generate various declaration files, which are linked during compilation time.

Unfortunately, the UDS output code 120, as depicted in FIG. 4C now requires intervention by the device developer 126 in order to implement code within the service control stub-methods 122 in order to generate updated stub-methods 124, which are combined with the UDS output code 120 in order to generate a complete set of UDS output code 130, as depicted in FIG. 1. Accordingly, what follows is a service control stub-method generated for a calculator device implementing two methods of add and subtract, for example, as described with reference to FIG. 10. As such, in one embodiment, the UDS output code may include the following stub-methods:

```
int Calculator::ADD(int Number1, int Number2)
{
    Res = Number1 + Number2;//SAMPLE CODE ADDED BY
    DEVELOPER
    //Add Actual implementation code here. After adding the code
      remove the comment from the line below to send the response.
//OutEvt->SetResp(UpnpMakeResponse("RegisterAdapter",ServiceType,
1,"Result",ToString
    (Res))));
    //Because this function is not implemented so just returning error
!!!!!!!
    OutEvt->SetErr("This action is not implemented yet !!!!!");
    return ERR_ACTION_NOT_IMPLEMENTED;
}
int Calculator::Substract(int Number1, int Number2)
{
    Res = Number1 - Number2;//SAMPLE CODE ADDED BY
    DEVELOPER
    //Add Actual implementation code here. After adding the code
      remove the comment from the line below to send the response.
//OutEvt->SetResp(UpnpMakeResponse("RegisterAdapter",ServiceType,
1,"Result",ToString
    (Res))));
    //Because this function is not implemented so just returning error
!!!!!!!
    OutEvt->SetErr("This action is not implemented yet !!!!!");
    return ERR_ACTION_NOT_IMPLEMENTED;
}
```

As such, the service control stub-method indicates a place mark where the developer 126 should provide his code as indicated "ADD ACTUAL IMPLEMENTATION CODE HERE". Accordingly, the developer is only required to write the portion of code to handle the function or event, while code to handle the underlying UPnP functionality is automatically generated. As indicated above, the developer would add the following sample code "Res=Number 1–Number 2" and remove the comment from "//OutEvt->SetResp . . . " to send the response to the control point. Consequently, the amount and requirement of code provided by the developer will vary from application to application, but ideally, the developer will have to write only application-specific code without having to worry about the specific underlying details of UPnP, which are provided by the CUdTool 102. Once the developer has updated the stub-methods, the stub-methods can be compiled with a universal device class library 300 along with a UPnP SDK 400, which are now described.

Referring now to FIG. 5, FIG. 5 depicts one embodiment of a class hierarchy 302 for the classes utilized by the universal device class library (UDCL) 300. The UDCL 300 provides a device class library that performs any UPnP-related activities, which are not performed by service control classes generated by the UDT 102. Accordingly, the UDS output service control classes 130 are compiled and linked with the UDCL 300, as well as the UPnP SDK, for example the Intel UPnP SDK to create a device executable 450. The device executable 450 provides UPnP functionality to the UPnP device described by the device description document 104 (FIG. 1).

As illustrated in FIG. 5, the UDCL 300 includes seven primary UPnP device utility classes. These UPnP device utility classes can, in one embodiment, be utilized by device developer to either initialize the UPnP device or extend its services. In this embodiment, the UDCL 300 is designed to work with code that is either generated by the UDT 102 or written by an independent device developer. Accordingly, the device executable 450 generated by combining the UCDL 300, the UDS output code 130, as well as the UPnP SDK 400 will create a root device and register it with the UDCL in order to receive events for services listed under the root device.

Figure 6:
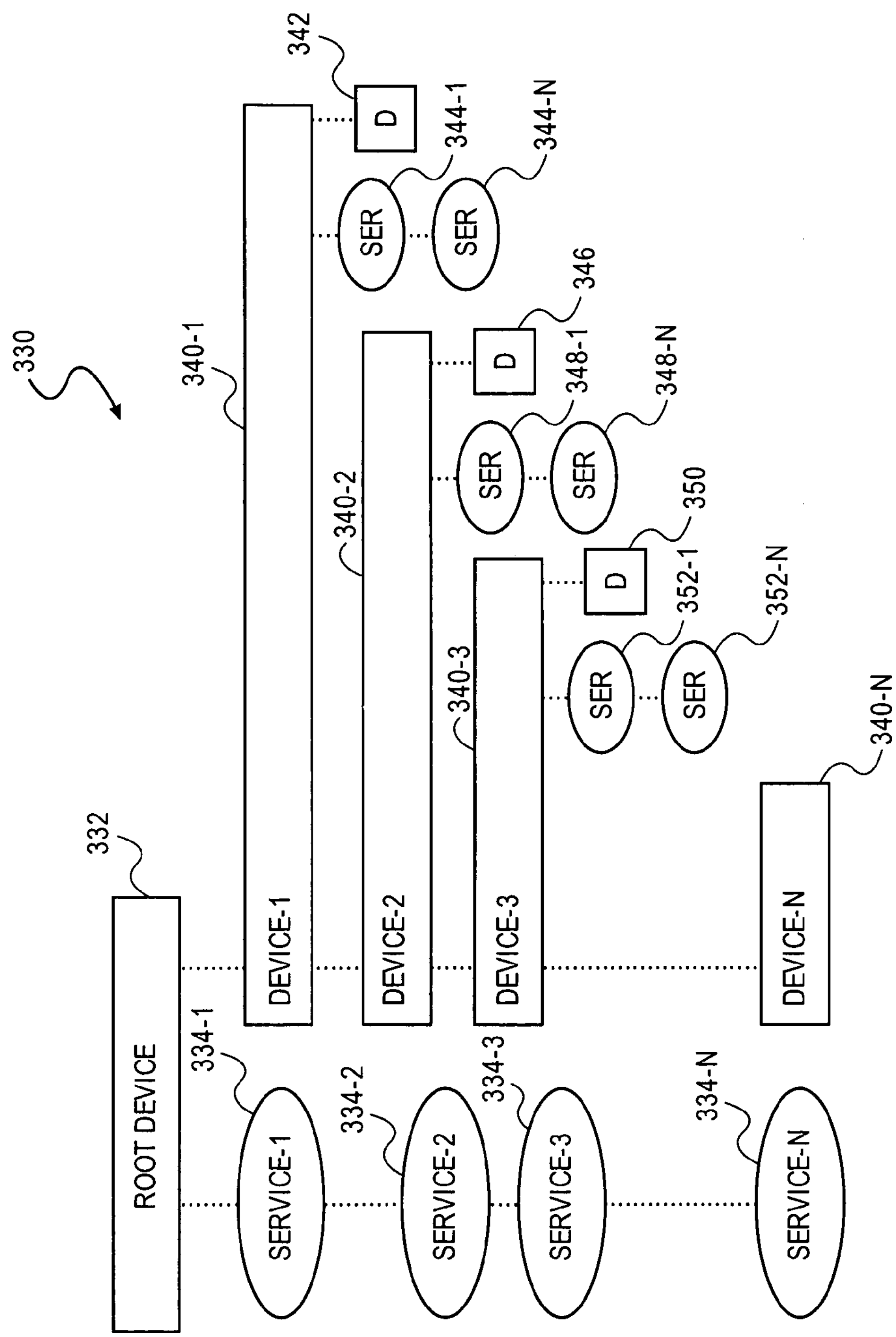
FIG. 6 depicts a universal device class library (UDCL) class hierarchy in accordance with a further embodiment of the present invention.

As illustrated, the UDCL includes the following classes: CList 304, CRootService 306, CDevice 308, CDeviceManager 310, CServiceManager 314, CEvent 316 and CEventListener 318, as depicted in FIG. 5. The CDeviceManager 310 manages a root device table (RDT) which stores instances of all root devices 332 registered with the UDCL 300. As such, the device manager 310 manages a device object tree (DOT) 330, as depicted in FIG. 6. In addition, the device manager 310 traverses through the DOT 330 and adds all embedded services in a service object table (SOT), which is managed by the CServiceManager class 314. In one embodiment, there are two categories of root devices that can be added into the root device table (RDT). A static root device sends advertisements and is searchable by a control point, while dynamic root devices are normally created on demand and do not send advertisements. In addition, the control point cannot search the dynamic root device.

As illustrated by FIG. 6, devices under a UDCL DOT 330 are structured as multiple tree nodes, which may contain other embedded devices 340 (340-1, . . . , 340-N) and services (344, 348, 352). On the other hand, services represent a leaf node in the UDCL DOT 330. As such, any device can be added or removed to/from any other devices. In the same way, services can also be added or removed from any device. The CEventListener class 318 accepts a DOT, for example DOT 330, as a listener object, which is passed to the CDeviceManager 310 for registration. CDeviceManager 310 finds the attached service object by traversing this DOT object 330 and registers its entry into a service object table.

A service object table (not shown) is, in one embodiment, a service database that stores instances of service objects, along with their respective device identification and service identification. The CServiceManager class 314 manages the service object table. Services registered in the SOT will receive event or action requests from the CEventListener object 318. Accordingly, a device executable created in accordance with the teachings of the present invention will create devices and service objects which are arranged into a desired hierarchy, as described in the UPnP description document 104. Consequently, once the devices and services are arranged in the pre-determined hierarchy, a final device object tree (DOT) object 330 is created. This DOT object 330 will provide representation of the device description document, or DCP document 104, that is finally registered with the UPnP SDK 400.

As such, in the embodiment described, the registration function in the UDCL 300 requires a DOT object. Consequently, the first DOT object is passed in as a constructor and functions as a static device that sends advertisements and is searchable by a control point. It is possible to register more than one DOT object with the UDCL as a dynamic root device, but such root devices are not searchable. As a result, the dynamic nature of the devices and services enabled by the present invention allows the hierarchy of devices and services to be changed at any time. In other words, any device or services can either be added or removed from a device object tree 330. These features provide an added flexibility that can change the device behavior during run-time. However, services in the embodiment described are to be derived from the CRootService class 206 in order to be added into the device object tree.

In a further embodiment, the UPnP event listener class 318 performs UPnP initialization registration and event handling for the device application. As such, CEventListener class 318 registers its own call-back function with the UPnP SDK 400, which receives all action and events for the device. CEventListener 318 is derived from CDeviceManager 310, which manages all static and dynamic root device objects, while CDevice 308 represents a root device or its embedded device class. Any device (either a root device, or an embedded device of the root device tree) can be registered with a CEventListener 318. Accordingly, the UDCL 300 provides the flexibility to modify the Device Object Tree (DOT) and depending on the application specific needs, the device developer either can register the complete DOT object or a portion of the devices within DOT object.

As described herein, a device with root device properties is referred to as a device object tree (DOT), which can be added to the root device table. In this embodiment, CRootService 306 works as a base class for all services generated by the UDT 102. CRootService 306 also implements operating system dependent data conversion routines and assists the UDT 102 in generating the operating system independent code for the service control classes 130. In addition, service classes derived from CRootService 306 require implementation of virtual callback methods declared in CRootService 306. CRootService 306 also stores information related to the service control classes in addition to the device identification and service identification of each respective class.

Finally, CEvent 316 is used as an object parameter to retrieve the response or error string back to the CEventListener class 318. In one embodiment, receiving an event from the client causes CEvent to create an object of the CEvent class and pass it as a parameter to the service callback function of CEventListener 318. Accordingly, the respective service control method executes a respective action in response to the event and sets the appropriate response or error string in the CEvent object. As such response to action or events is automatically provided by the UDCL 300.

Figure 7:
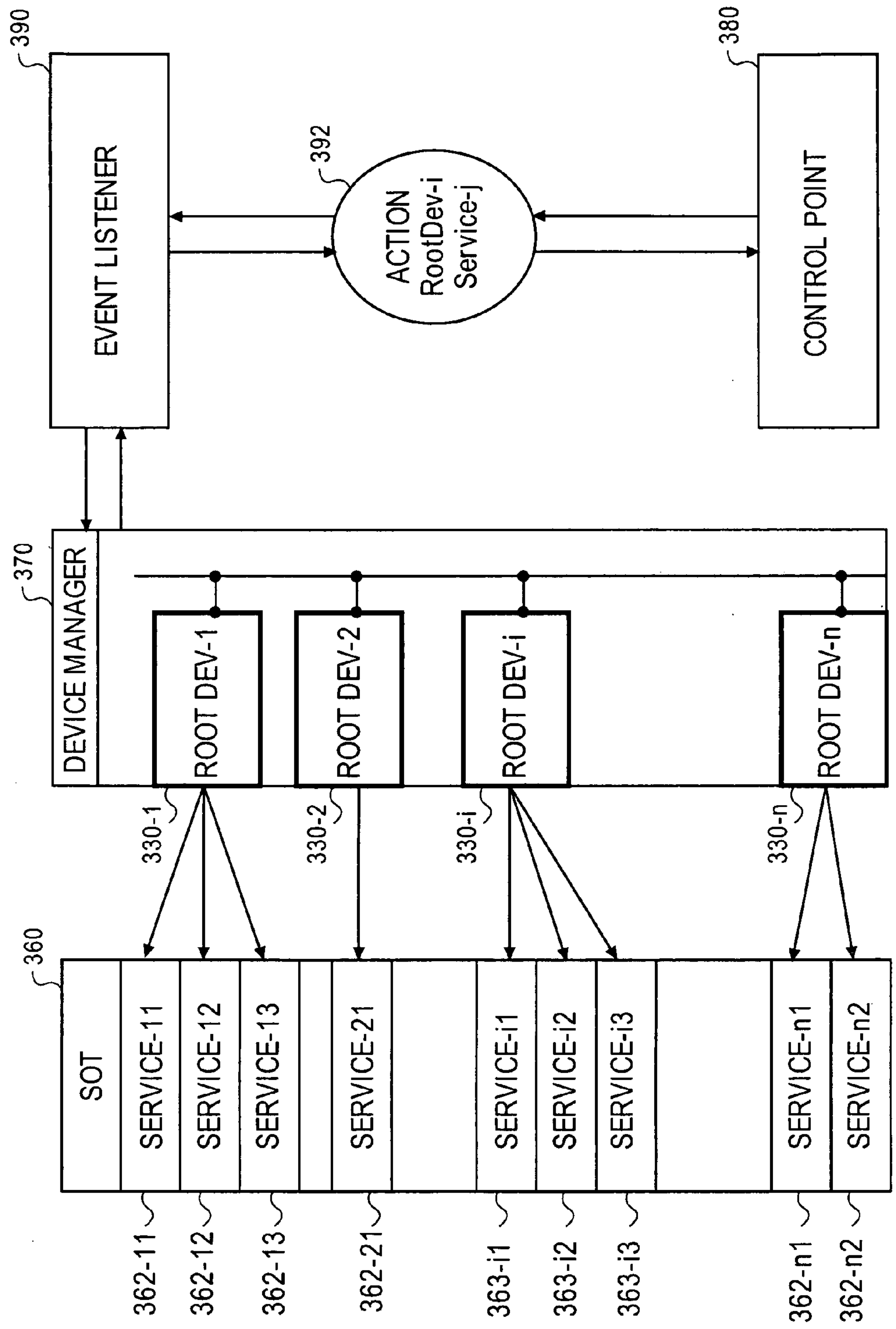
FIG. 7 depicts a block diagram illustrating components for responding to actions or events from a control point in accordance with a further embodiment of the present invention.

Referring now to FIG. 7, FIG. 7 depicts an embodiment illustrating response to events detected by the CEventListener class 318. As depicted, all UPnP related actions or events are dispatched to the CEventListener object 318 (Event listener 390). Once received, the action or event 392 is passed along with any received parameters to its local callback function for execution. In addition, a new CEvent object 316 is also passed with each client request, which assists in transporting the application response back to the UDCL 300. In one embodiment, a CServiceManager (Device manager 370) assists in finding the actual service object within the service object table (SOT) 360 based on the device ID and service ID. Once the correct service instance is found, its callback function is executed to complete processing in response to the received action or event. Based on the responsibilities of different modules, here is a grouping of tasks that are accomplished by individual modules or callback functions in one embodiment of the present invention:

Device Manager

Manages the root device table.

Adds or removes the root device as a listener object.

Registers the root device with Intel's UPnP SDK.

Finds all the service listed under the root device and registers its entry with the Service Manager.

Service Manager

Manages Service Object Table (SOT).

Adds or removes a service object from the service table.

Provides the search utility to find the service.

EventListener

Receives Action/Event.

Separates out the parameter required by the action/event.

Calls the local callback function with these parameters.

Send the response back to the library, which is finally sent to the control point.

Local Callback (EventListener)

Calls the ServiceManager to find out the required service instances.

Calls predefined callback function of the found service.

Returns the result to EventListener.

Service Callback for Action

Retrieves the input parameters based on the action.

Looks for the locally defined function (Action) that can executes this request.

Calls the appropriate action by passing the parameters retrieved in the previous step.

Method for Action

Executes the action.

Depending on the execution creates the response packet.

Sets the event object with this response packet.

Returns the appropriate error code.

Service Callback for Subscription (No separate method for subscription)

Creates the property set by putting all evented variable and its value in it.

Set event object with this property set.

Returns the appropriate error code.

Figure 8:
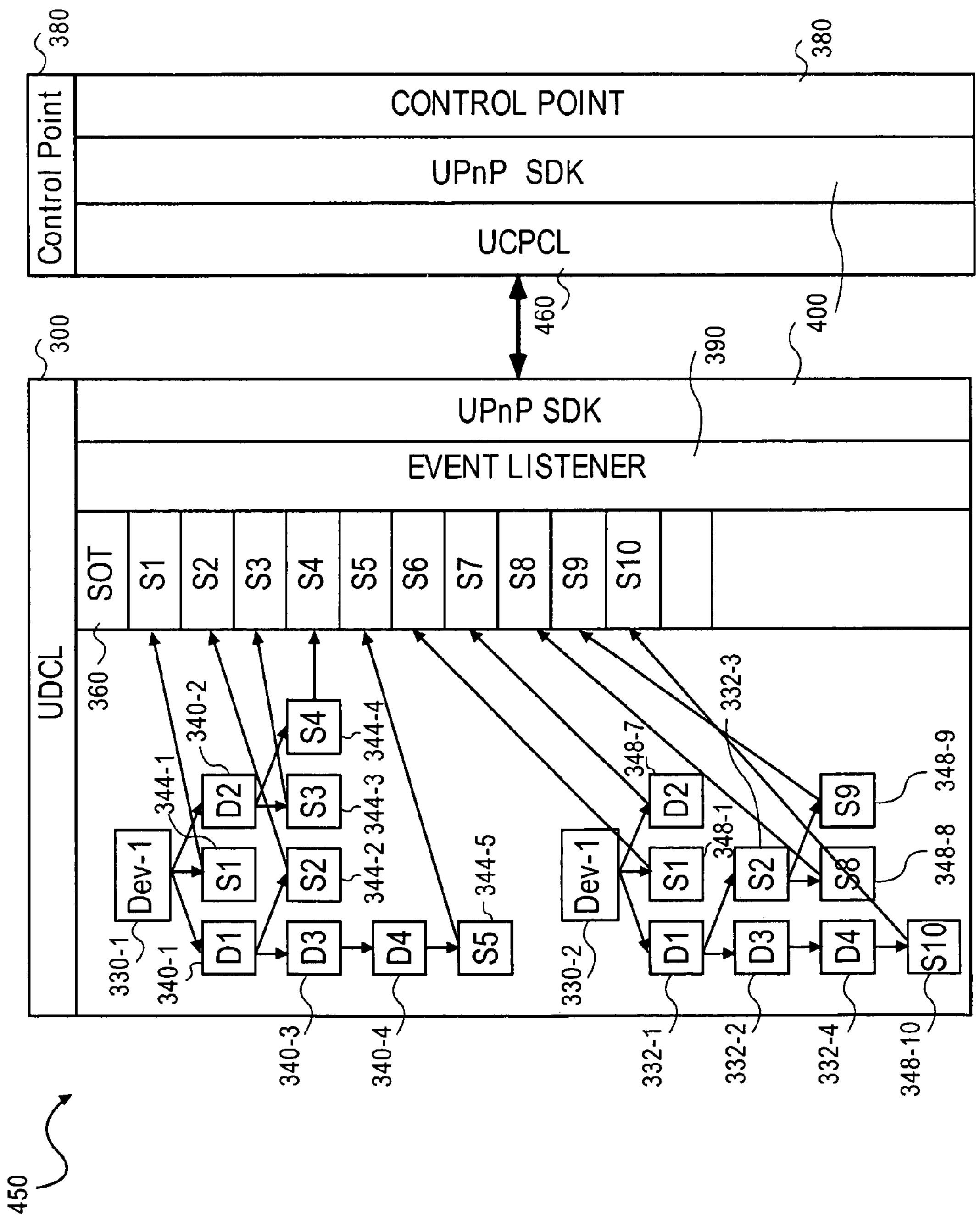
FIG. 8 depicts a block diagram illustrating creation of instances of services and devices by a UPnP device executable in accordance with an exemplary embodiment of the present invention.

Referring now to FIG. 8, FIG. 8 depicts one embodiment of a device executable 450 including a device object tree 330 which includes a hierarchy of embedded devices and services. The executable 450 further includes a service object table 360 including the various services, as well as the event listener 318 and UPnP SDK 400. In addition, in the embodiment described, the control point 380 includes a universal control point class library (UCPCL) 460, the UPnP SDK 400 and the control point 380. As such, the CServiceLinker class 142 generated by the UDT 102 creates instances of services and devices during run-time.

Accordingly, once executed, these service objects are finally inserted into the device to create a desired hierarchy, as described by the UPnP device description document 104. As described above, each service is derived from CRootService 306, which includes three virtual callback methods, one for each action, subscription and state variable events. When the CEventListener 318 receives a UPnP event, it looks for the service callback that can accomplish this request or respond to the received event. CServiceManager 314 helps the CEventListener class in finding the correct service object within the service object table 360. Response to events is further illustrated with reference to FIG. 9.

Figure 9:
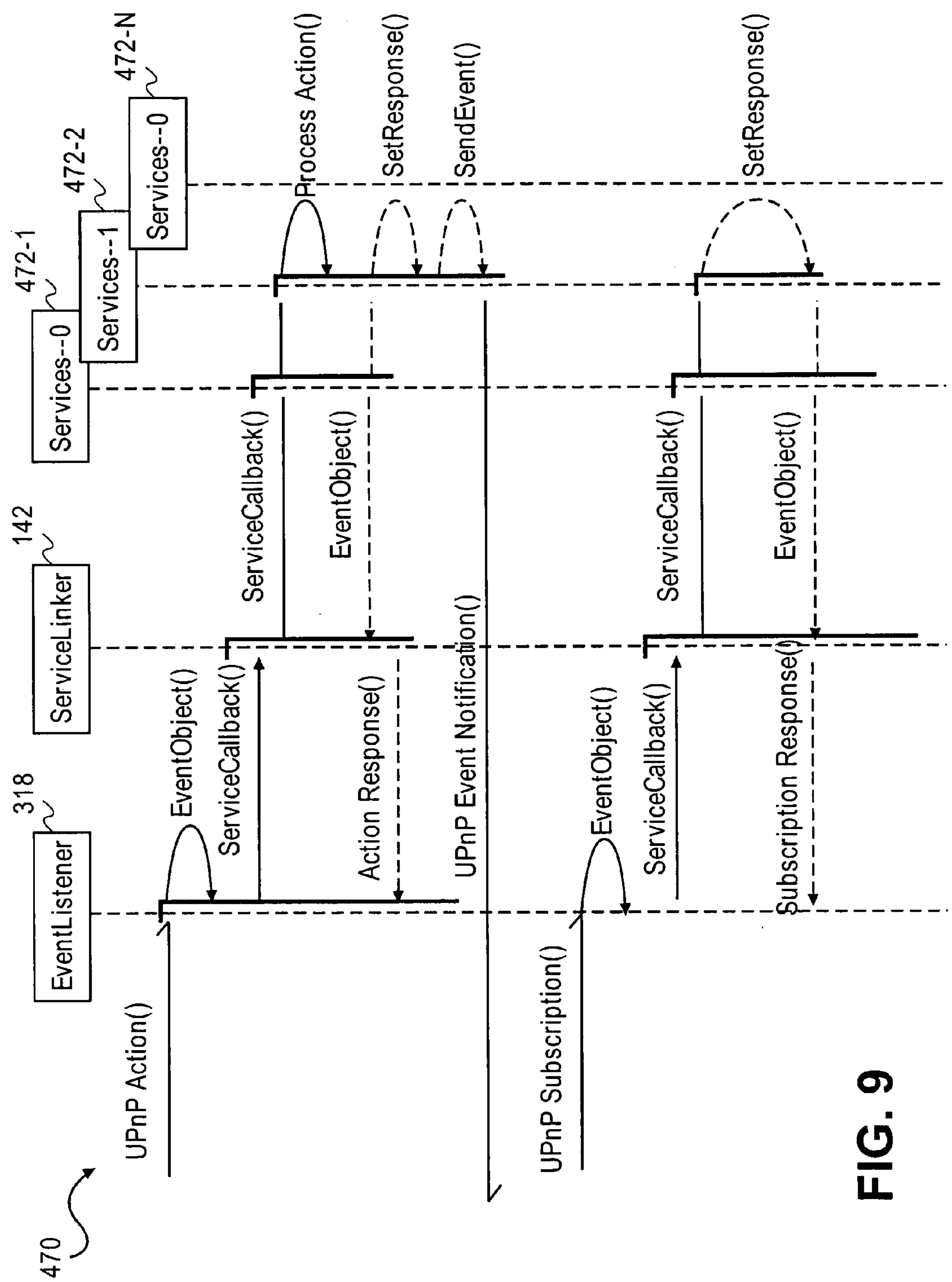
FIG. 9 depicts a block diagram illustrating event flow in accordance with the exemplary embodiment of the present invention.

Referring now to FIG. 9, an event flow diagram 470 is provided which illustrates response to events by an executed device executable generated in accordance with an embodiment of the present invention. CEventListener class 318 captures UPnP events on behalf of the services of a root device. Each time an action or event is received, an object of CEvent is created and passed back to the local callback function with any remaining parameters. The local callback function searches the SOT 360 and forwards the event or action packet to the appropriate service callback. Once the correct service object is discovered, the requested action and additional parameters are passed back to its callback function.

As described above, a callback function within the selected service object processes the respective action and looks for a method that can proceed with the current action. Each service implements a separate method for each action declared in their SCPDs 108. Accordingly, in the embodiment described, the responsibility of the local service callback is to parse the action string and separate out the parameters for any locally defined action methods. The abstracted parameters are then converted into their local type before being passed to the action method. Once converted, the locally defined service method then processes the action and sets any responses to the action within a CEvent object 316.

Figure 10:
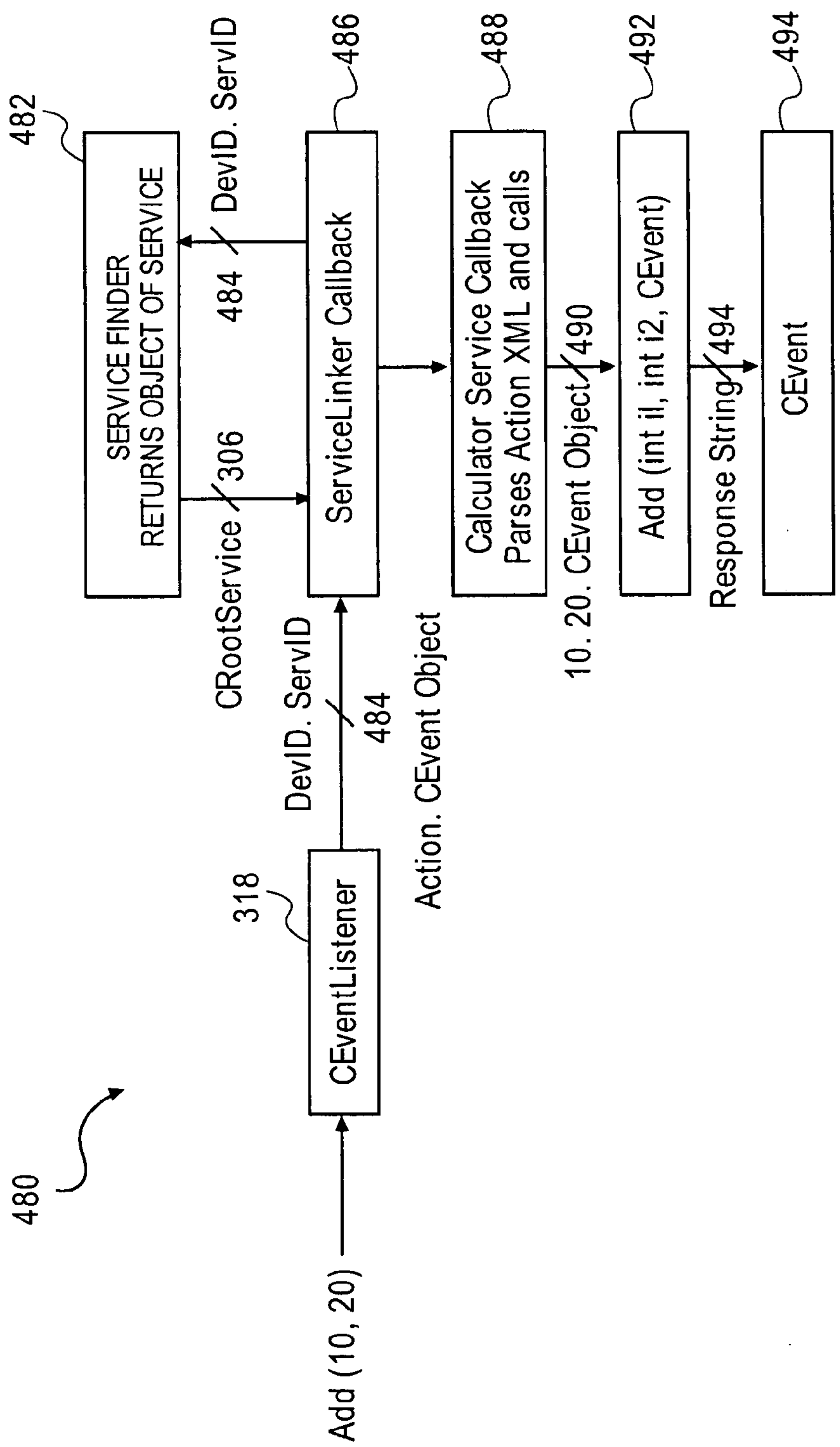
FIG. 10 depicts a block diagram illustrating class components that function to respond to the event flow as depicted as in FIG. 9 in accordance with an exemplary embodiment of the present invention.

Referring now to FIG. 10, FIG. 10 depicts an embodiment of an example of an organizer device 480 that includes three different services: calculator, clock and alarm. Service calculator contains four different actions: add, subtract, multiply and divide. As depicted, a control point is now interested in adding members remotely so he sends an Action Add to service calculator. Accordingly, the following steps are performed to create an organizer device.

1. Create ORGANIZER root device

CDevice Org=new CDevice(OrganizerDeviceId, OrganizerDeviceType, . . . )

2. Create CALCULATOR as embedded service.

CRootService Cal=new CCalculator(OrganizerDeviceId, CalculatorServiceId, . . . )

3. Create CLOCK as embedded service.

CRootService Clk=new CClock(OrganizerDeviceId, ClockServiceId, . . . )

4. Create ALARM as embedded service.

CRootService Alr=new CAlarm(OrganizerDeviceId, AlarmServiceId, . . . )

5. Now add all these service in device Organizer.

Org.Add(Cal); Org.Add(Clk); Org.Add(Alr);

In the embodiment described, it is assumed that service calculator clock and service alarm are derived from CRootService 306. Once these services are added under root device organizer, the root device can be registered with CEventListener 318 in order to receive events. As such, on the device side, CEventListener class 318 first receives the respective action request. This action is passed to the local callback function. Next, the service object table is searched to find the required service based on a received device ID and service ID 484. The CServiceManager 314 finds the service and returns its object through the CRootService parameter 306 as depicted at process block 484.

Once the required service is found, its callback function is called to process the action at process block 486, using the CServiceLinker 142. The calculator service callback functions then looks for the appropriate action method to execute in response to the incoming action. The service callback function parses this input XML and calls the appropriate action with locally converted parameters at process block 488. After the action is processed at block 420, the CEvent object 316 is set with the appropriate response string that is finally received by the control point at process block 494. In the case of an error during the action processing, the CEvent is set to return the appropriate error string.

Figure 11:
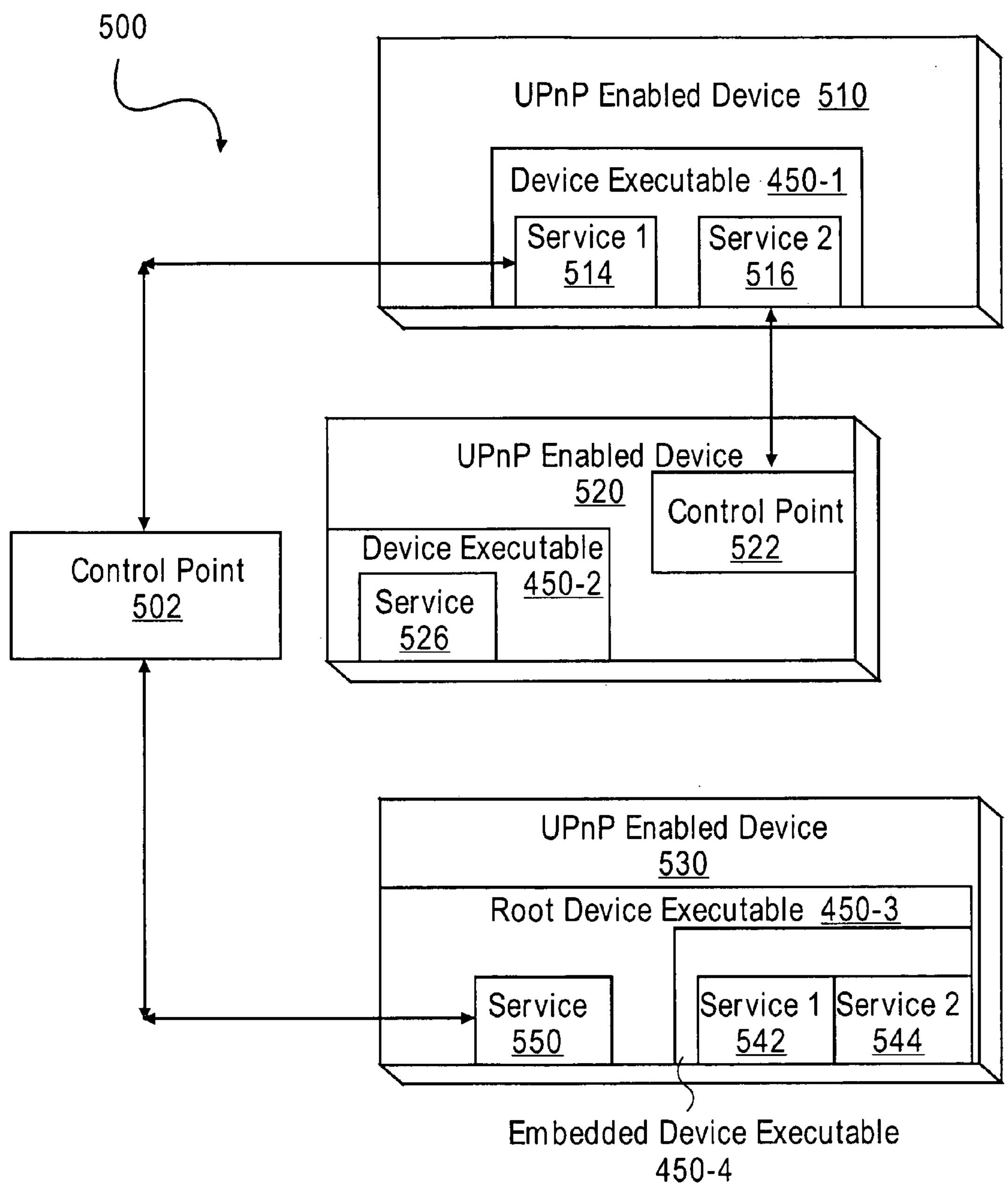
FIG. 11 depicts a block diagram illustrating a UPnP device network formed in accordance with the teachings of the present invention to illustrate a further embodiment of the present invention.

Referring now to FIG. 11, FIG. 11 depicts one embodiment of a UPnP device network 500. The UPnP device network 500 includes a control point 502 which searches the UTnP enabled devices (510, 520 and 530) and sends action and subscription requests to/from the various devices. A UPnP enabled device 510 includes device executable 450-1, generated in accordance with the embodiments of device executable 450 as illustrated in FIGS. 1 and 8, which includes service-1 514 and service-2 516. An additional UPnP enabled device 520 includes device executable 450-2 (e.g., device executable 450 of FIG. 8) including service 526 while UPnP enabled device 520 also includes a control point 522. In certain embodiments, the UPnP enabled device may include an internal control point, but this is not a requirement.

A final UPnP enabled device 530 includes root device 532, which includes embedded device 540, with service 542 and service 544. The root device also includes service 550. Each service generally includes a state table. However, conventional UPnP enabled devices require a control server and an event server in order to receive action events from the control point and respond to the action events using the control server. In contrast to conventional UPnP devices, control server and event server functionality are provided by the UPnP SDK 450 when the CEventListener class 318 registers with the UPnP SDK 400 to receive action and other requests.

Operation

Figure 12:
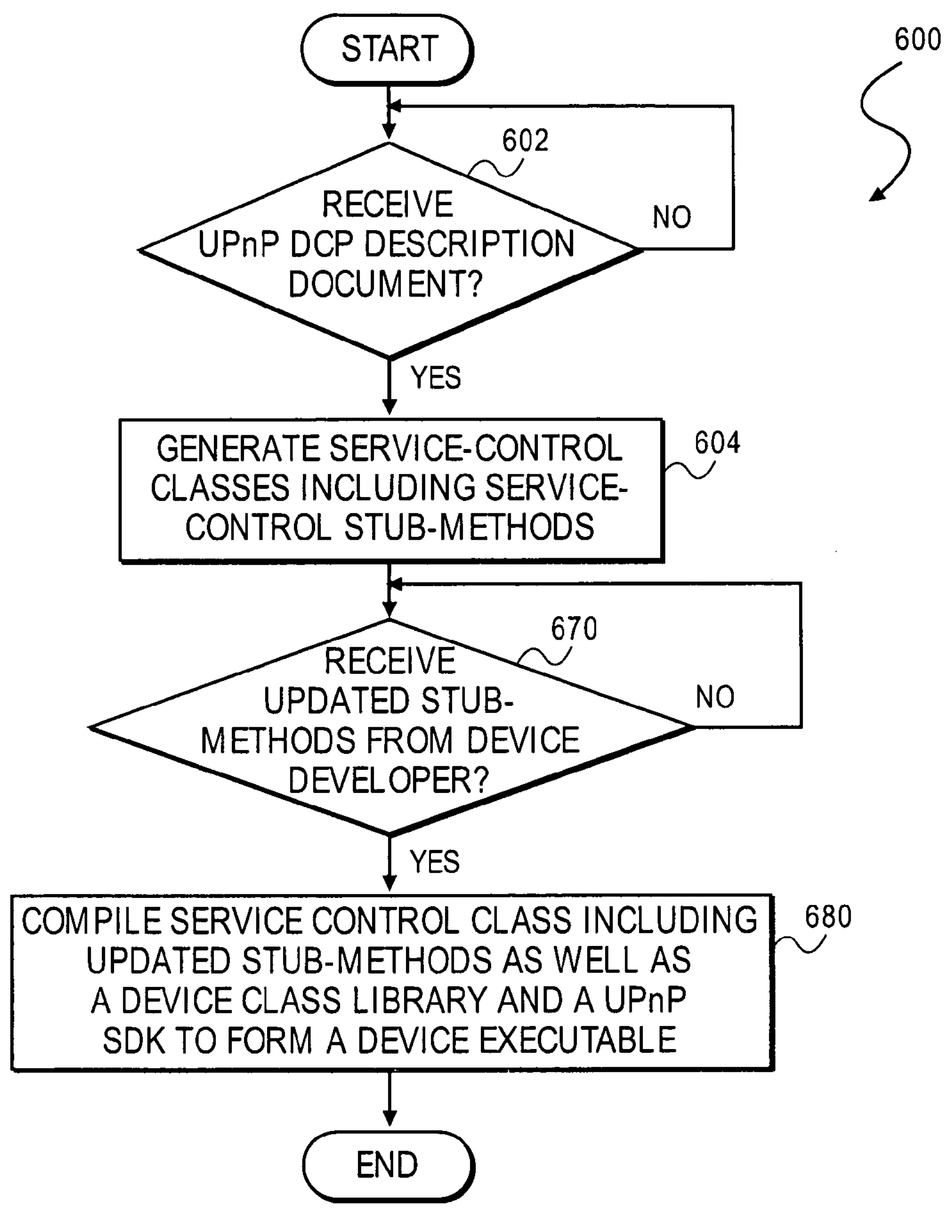
FIG. 12 depicts a flow chart illustrating a method for UPnP device code generation utilizing one or more device description documents in accordance with an embodiment of the present invention.

Referring now to FIG. 12, FIG. 12 depicts a method 600 for UPnP device code generation using XML, for example as depicted in FIGS. 1 and 2. At process block 602, a UPnP device description document 104 is received from a device developer 126. In one embodiment, the UPnP device description document 104 is a device control protocol (DCP) description document, which includes links to one or more service control protocol description (SCPD) files 108. Once received, process block 604 is performed. At process block 604, a UDTool 102 generates one or more service control class files 120, including one or more service control stub-methods 122, which are collectively referred to as Universal Device Service (UDS) output code 120. At process block 670, the service control class files 120, including updated service control stub-methods as modified by device developer are received.

As described above, the device developer 126 is required to modify service control stub-methods 122 for each service listed within the device description document 104. As such, the device developer 126 will update the stub-methods 122 to generate updated stub-method 124 for responding to actions and events received by a UPnP device described by the UPnP device description document 104. Accordingly, the updated stub-methods 124, in addition to the service control class files 120, are recombined to form service control class file UDS output code 130. Finally, at process block 680, the service control class files and updated service control stub-methods 130, along with a device class library and a UPnP software developing kit (SDK) are compiled by compilation block 402 in order to generate a device executable 450 for the UPnP device.

Figure 13:
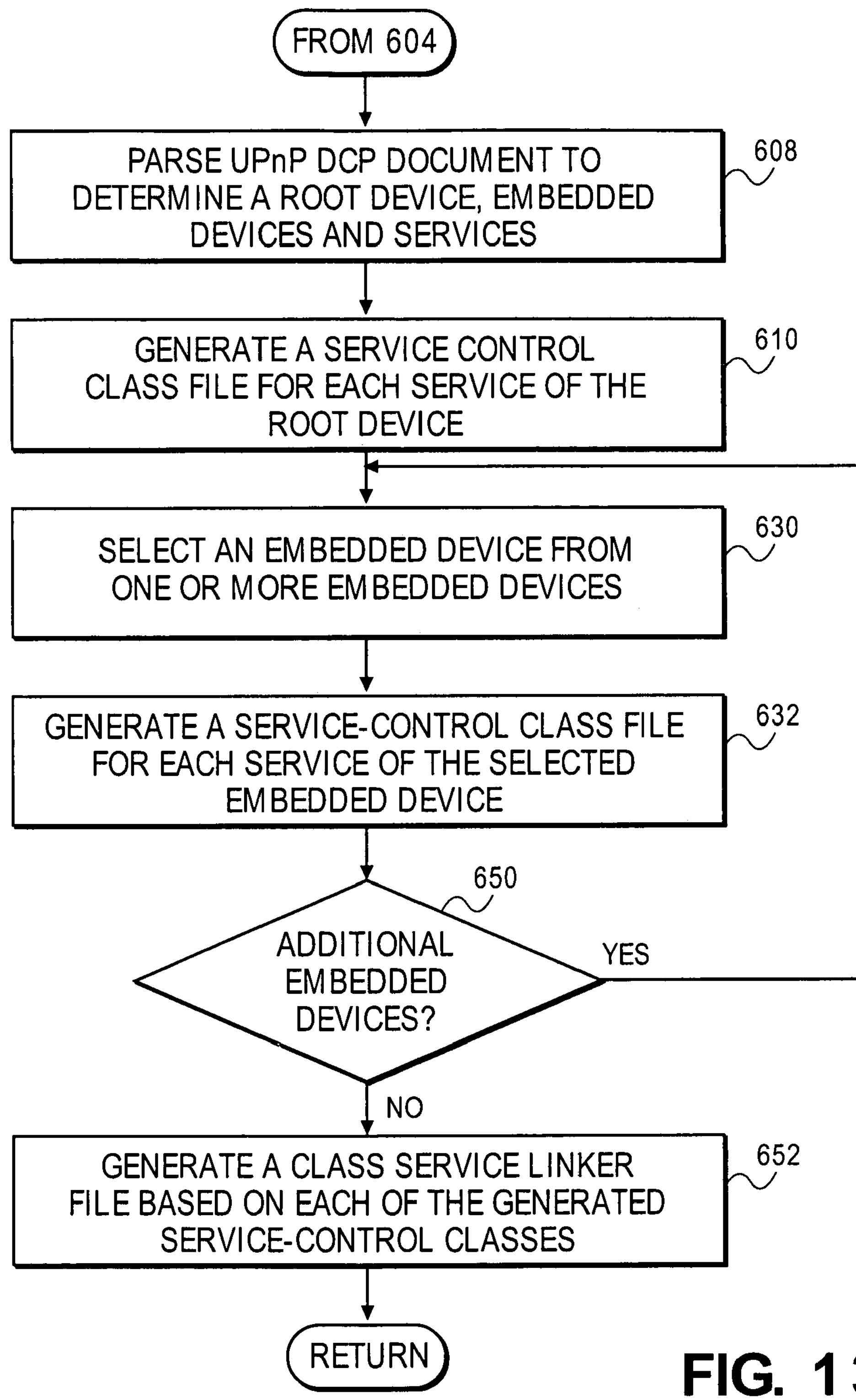
FIG. 13 depicts a flow chart illustrating an additional method for generating service control classes in accordance with a further embodiment of the present invention.

Referring now to FIG. 13, FIG. 13 depicts an additional method 606 for generation of the service control class files of process block 604 as depicted in FIG. 12. At process block 608, the UPnP device description document 104 is parsed to determine a root device including one or more services. In addition, the root device may include one or more embedded devices with each including one or more services. Each services of either the root device or the embedded devices is defined by a service control protocol description (SCPD) file. Once parsed, at process block 610, a tool 106 of the UDTool 102 generates a service control class file for each of the one or more services of the root device.

At process block 630, an embedded device from the one or more embedded devices of the root device is selected. Next, at process block 632, a service control class file for each of the one or more services of the selected embedded device is generated. At process block 650, process blocks 630 and 632 are repeated for each of the one or more embedded devices of the root device. Finally, once service control class files are generated for each of the services of the root device as well as each of the services of the embedded devices, process block 652 is performed. At process block 652, a class linker 140 generates a service linker class file based on each of the service control classes generated by the class generator 110. As described above, the service linker class file 142 enables linking of the service control classes during compilation at process block 680 to generate the device executable 450 in addition to cheating a DOT object at runtime.

Figure 14:
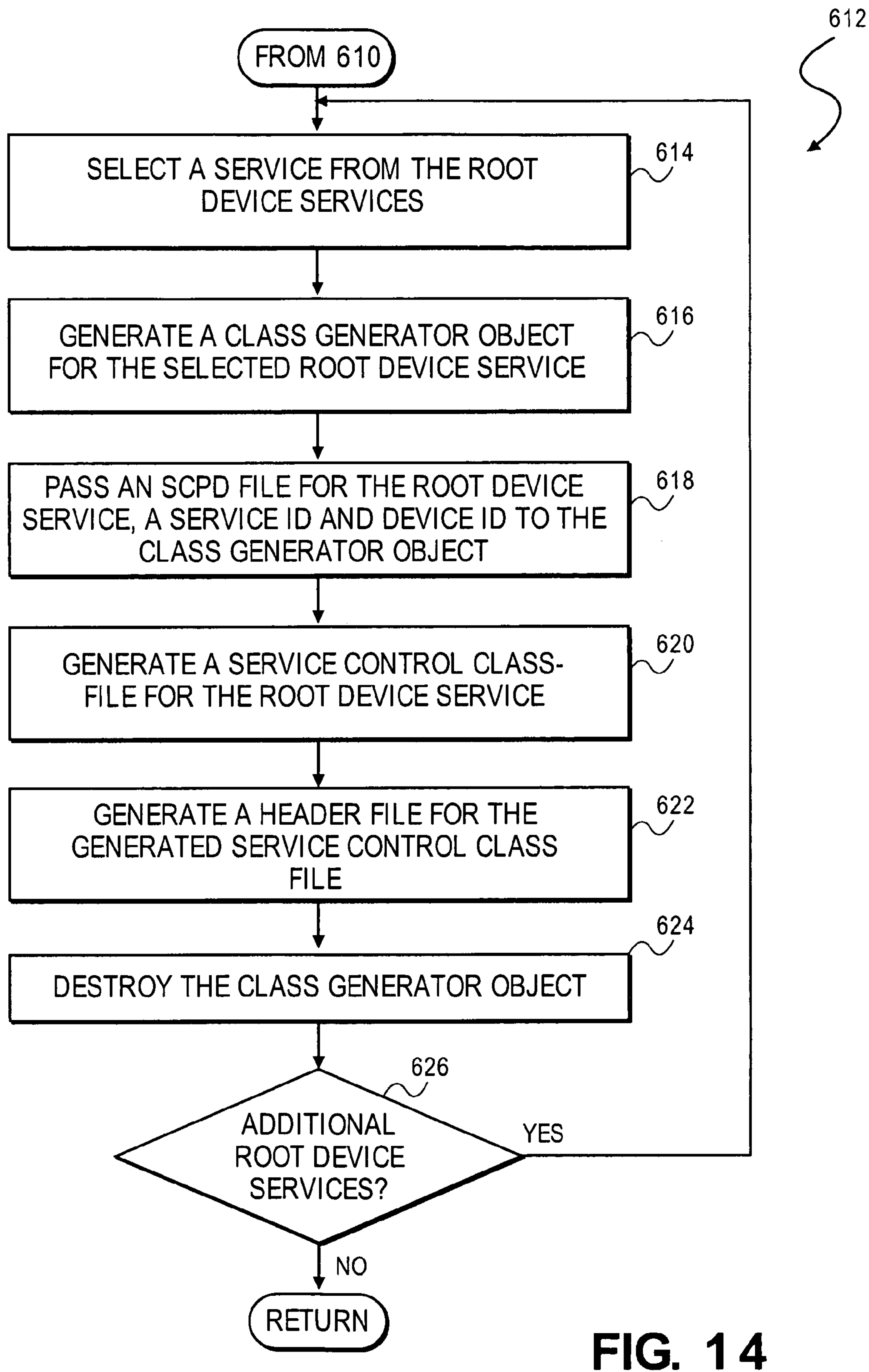
FIG. 14 depicts a flow chart illustrating a method for generating service control classes for a root device in accordance with a further embodiment of the present invention.

Referring now to FIG. 14, FIG. 14 depicts a block diagram illustrating a flow chart of an additional method 612 for generation of the service control class files for the root device at process block 610 , as depicted in FIG. 13. At process block 614, a service from the one or more services of the root device is selected. At process block 616, a class generator object is generated for the selected service of the root device. Next, at process block 618, an SCPD file 108 is passed to the class generator object, including a device ID of the root device and a service ID of the selected service. At process block 620, the class generator object 110 generates a service control class file based on the received SCPD file 108 and the service and device IDs. Next, at process block 622, the class generator object generates a header file corresponding to the generated service control class file.

Once generated, at process block 624, the class generator object is destroyed. Finally, at process block 626, process blocks 616–624 are repeated for each of the one or more services of the root device.

Figure 15:
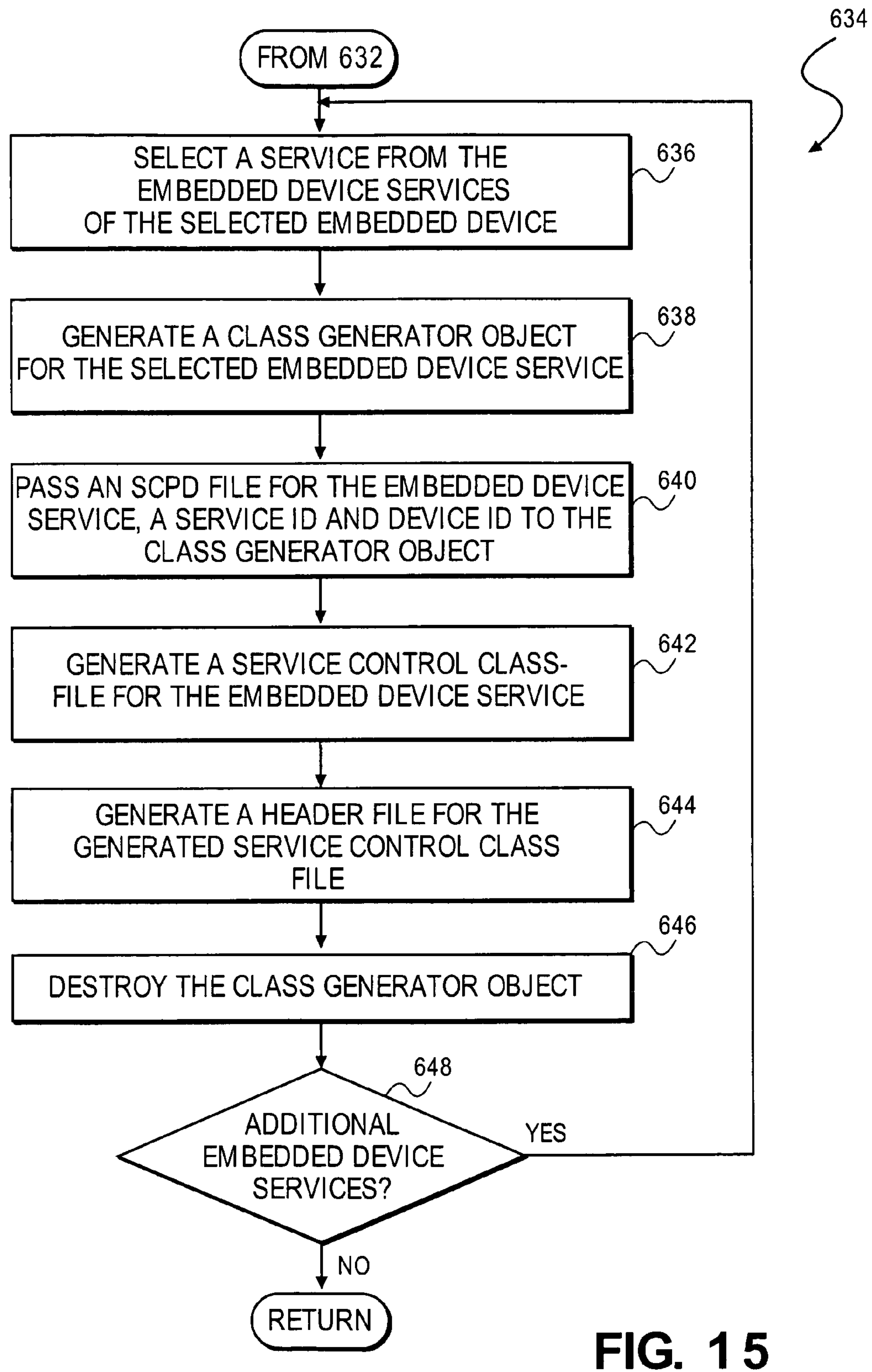
FIG. 15 depicts a flow chart illustrating a method for generating service control class files for an embedded device in accordance with a further embodiment of the present invention.

Referring now to FIG. 15, FIG. 15 depicts a flowchart illustrating an additional method 634 for generation of service control class files for a selected embedded device of process block 632, as depicted in FIG. 13. At process block 636, a service (embedded device service) from the one or more services of the selected embedded device is selected. At process 638, a class generator object is created for the selected embedded service device. Next, at process block 640, an SCPD file, including a device ID of the selected embedded device and a service ID of the selected service is passed to the class generator object.

Once the required parameters are received, process block 642 is performed. At process block 642, the class generator object generates a service control class file based on the received SCPD file, the service ID and the device ID and other parameters. At process block 644, the class generator object generates a header file corresponding to the generated service control class file. Once generated, at process block 646, the class generator object is destroyed. Finally, at process block 648, process blocks 636–646 are repeated for each of the one or more embedded device services of the selected embedded device.

Figure 16:
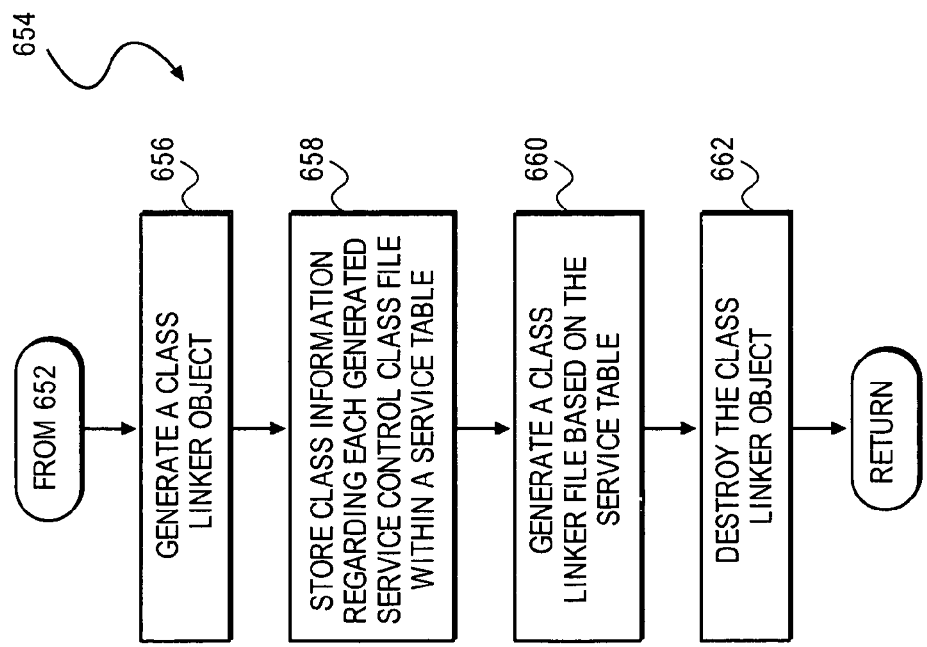
FIG. 16 depicts a flow chart illustrating a method for generating a class service linker file in accordance with a further embodiment of the present invention.

Referring now to FIG. 16, FIG. 16 depicts a flowchart illustrating an additional method 654 for generation of the service linker class file of process block 652, as depicted in FIG. 13. At process block 656, a class linker object is created by, for example, by the main class CDTool 158 (FIG. 3). At process block 658, class information regarding each generated service control class file is stored within a service table of the class linker object 140. At process block 660, the class object 140 generates the class linker file 142 based on the service table of the class linker object 140. Finally, at process block 662, the class linker object 140 is destroyed.

Figure 17:
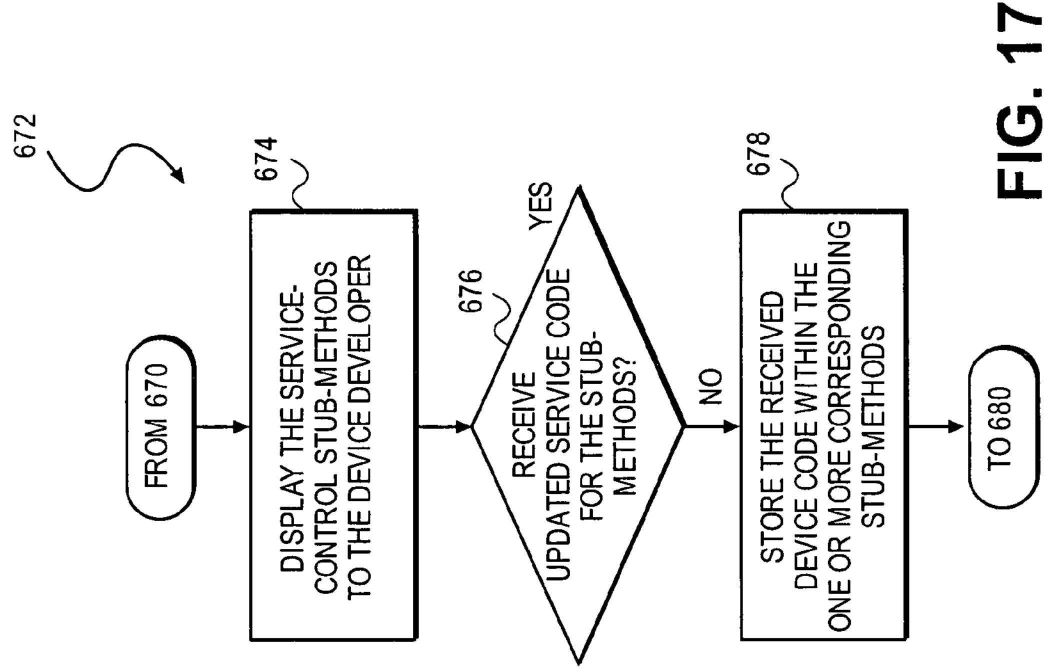
FIG. 17 depicts a flow chart illustrating a method for receiving updated service control stub-methods in accordance with a further embodiment of the present invention.

Referring now to FIG. 17, FIG. 17 depicts a flowchart illustrating an additional method 672 for receipt of service control class files of process block 670, as depicted in FIG. 12. At process block 674, the UDTool 102 may display the one or more service control stub-methods 122 to the device developer 126. Next, at process block 676, the UDTool will receive code from the device developer for implementing the one or more service control stub-methods 124 in order to respond to actions and events received by the UPnP device. Finally, at process block 678, once the code is received, the UDTool 102 will store the received code within the one or more corresponding service control stub-methods in order to form the service control UDS output code 130.

However, in an alternative embodiment, once the UdTool 156 generates the service specific UDS class code 122, the role of UdTool 156 is over. In this embodiment, unmodified UDS output code 122 can be compiled and linked to create an executable for the device. Although the device can response to subscription, action and state variable requests, each action request returns a response as "This method is not implemented." Consequently, it is the responsibility of the developer to modify each stub-method 122 with code to send and implement a correct response. The device developer is required to write the implementation portion of the code, while the rest of the code, such as sending the action responses, event responses, etc., is automatically generated. In this embodiment, the UdTool generated UDS class code 120 is a text file that can be modified under any editor, and compiled and linked with any compiler depending on the type of code that UdTool 156 generated.

Figure 18:
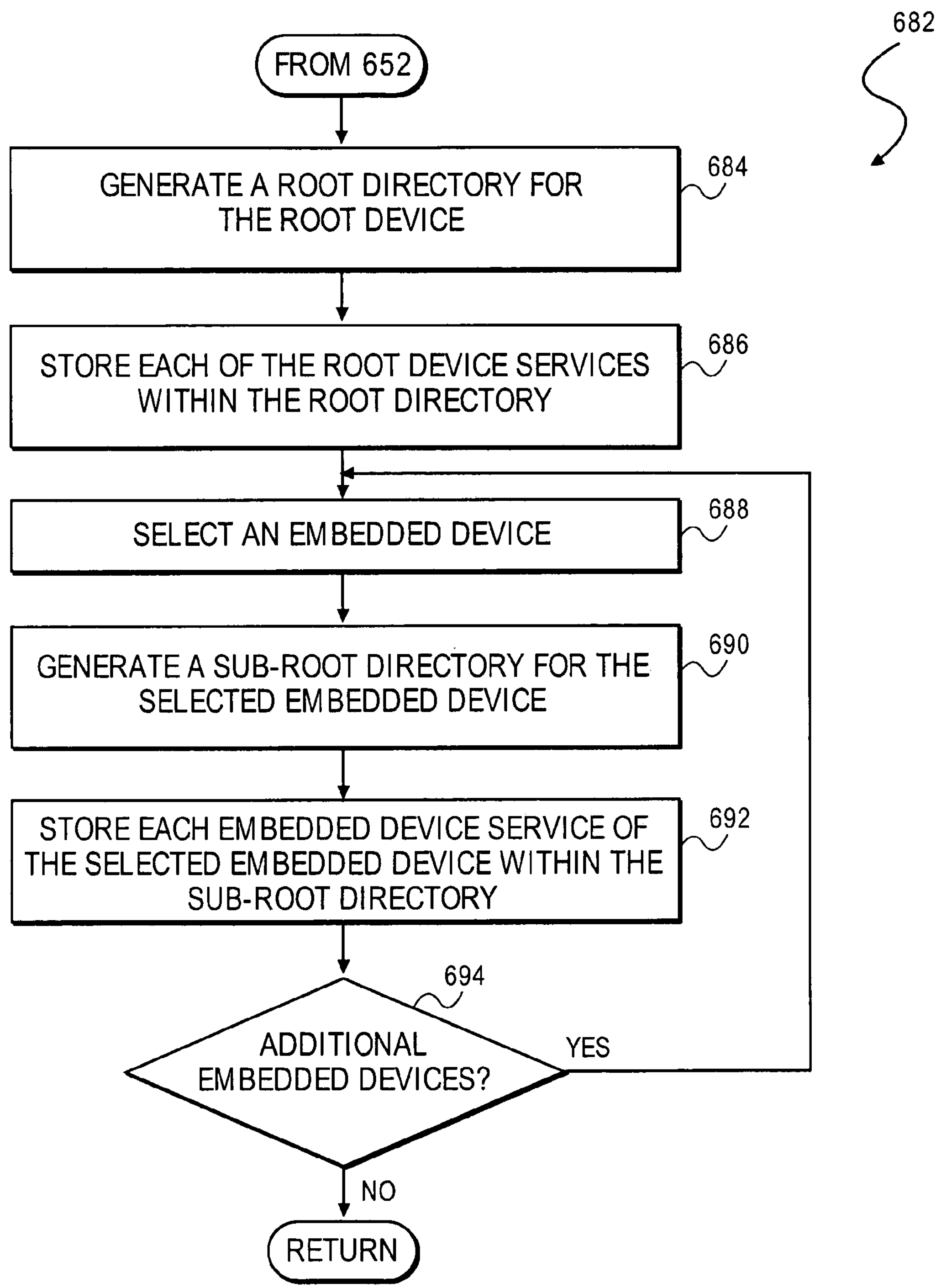
FIG. 18 depicts a flow chart illustrating a method for storing root device services and embedded device service in accordance with a further embodiment of the present invention.

Referring now to FIG. 18, FIG. 18 depicts a flowchart illustrating a method 682 for generating directory information and storing the UDS output code 120 generated by the UDTool 102. At process block 684, the UDTool 102 generates a root directory for the root device indicated in the device description document 104. Next, at process block 686, the UDTool 102 stores each of the one or more services of the root device within the root directory. Next, at process block 688, the UDTool 102 selects an embedded device from the one or more embedded devices of the root device. Once selected, at process block 690, the UDT 102 generates a stub-root directory for the selected embedded device. At process block 692, each of the one or more services of the selected embedded device are stored within the embedded device sub-root directory. Finally, at process block 694, process blocks 688–692 are repeated for each of the one or more embedded devices of the root device and any embedded device of each embedded device.

Figure 19:
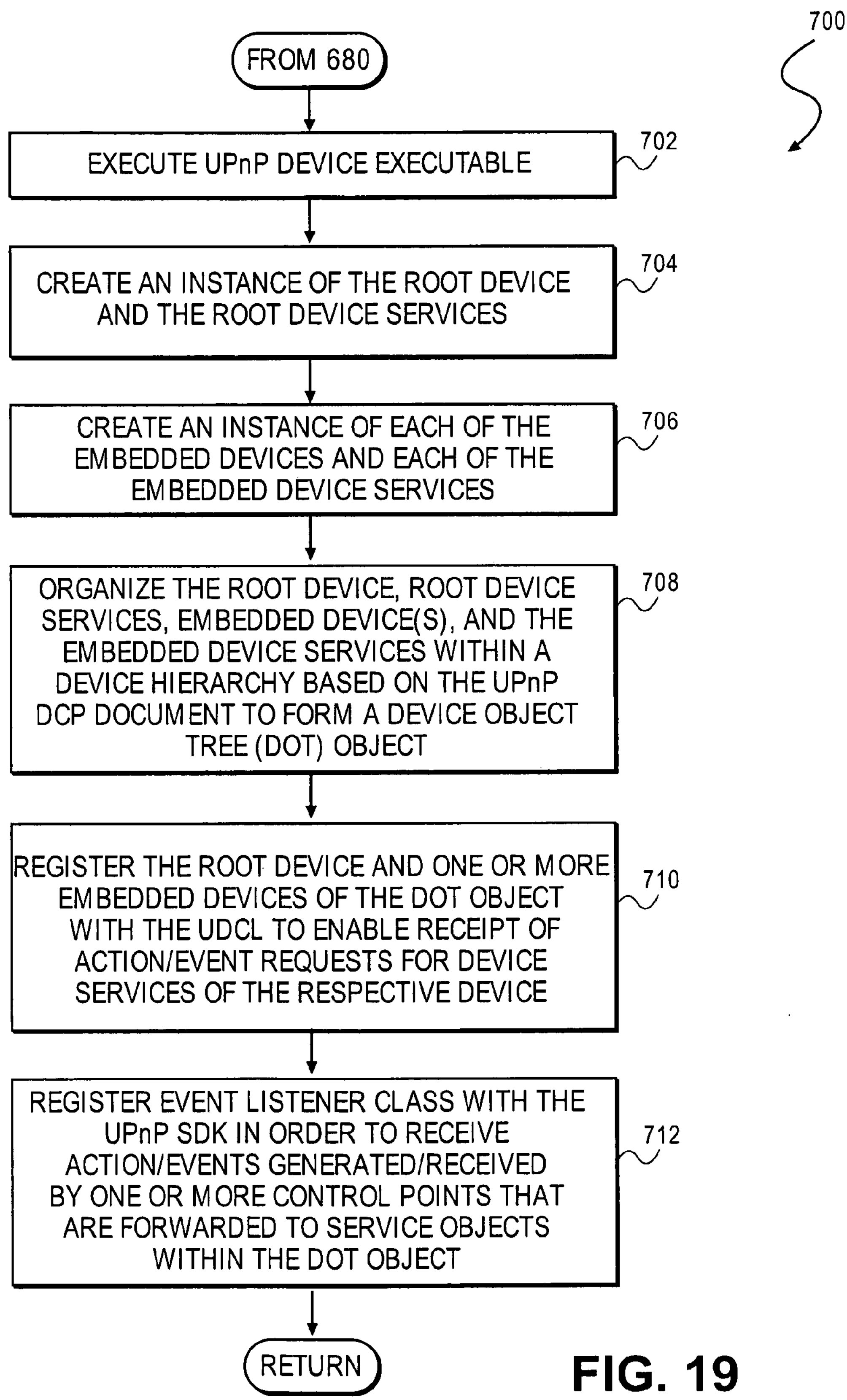
FIG. 19 depicts a flow chart illustrating a method for executing a UPnP device in accordance with a further embodiment of the present invention.

Referring now to FIG. 19, FIG. 19 depicts a method 700 for execution of the device executable 450 in accordance with a further embodiment of the present invention as depicted in FIG. 8. At process block 702, the device executable 450 is executed. At process block 704, an instance of the root device, as well as each of the one or more services of the root device, is created. Next, at process block 706, an instance of each embedded device and each of the one or more services of the respective embedded device is created. Once created, process block 708 is performed. At process block 708, the root device and embedded devices, as well as the services of both the root device and the embedded devices, are organized within a device hierarchy based on the device description documents to form a DOT object, for example the DOT object 330 tree-based hierarchy as depicted with reference to FIGS. 6 and 7.

Once the DOT object is created at process block 708, it is registered with CEventListener class 318 of the UDCL 300. If the registration is successful, each service listed in this DOT object is places into a SOT. In one embodiment, each device executable 450 creates a single object of the CEventListener class 318 that in turn creates a CDeviceManager object 310 and CServiceManager object 314. Accordingly, ServiceObject Table (SOT) is created and initialized with the creation of the CServiceManager object whereas a Root Device Table (RDT) is created with CDeviceManager. As such, the SOT keeps the instances of the root/embedded device services whereas the RDT keeps track of all registered root devices. (It is possible to register more than one rood device with the UDCL 300).

Accordingly, at process block 710, the DOT object is registered with the CEventListener class 318. As a result, a service object table (SOT) will list each service, a service identification code of the service and a device identification code corresponding to a parent device of the service. In addition, each service class instance is linked to a corresponding entry in the service object table 300. Consequently, each device within the DOT that is registered with the UDCL is enabled for receipt of events from one or more services of the respective device. Finally, at process block 712, the CEventListener class 318 is registered with the UPnP software development kit 400 in order to receive action/event requests from one or more control points, which are provided to registered services of the DOT object.

Figure 20:
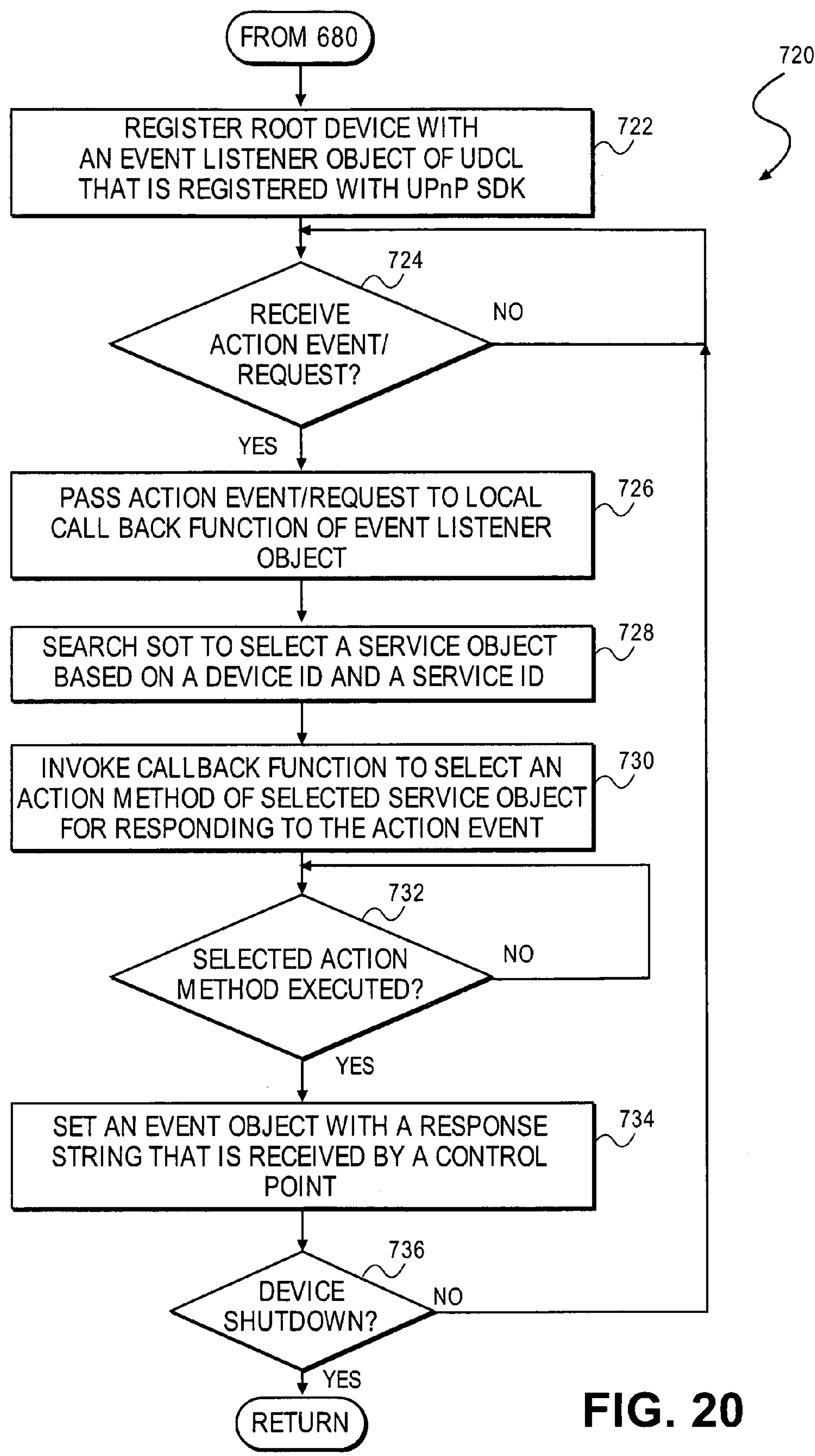
FIG. 20 depicts a flow chart illustrating a method for responding to UPnP action/even requests in accordance with a further embodiment of the present invention.

Finally, referring now to FIG. 20, FIG. 20 depicts an additional method 720 for responding to UPnP action events, for example as depicted with reference to FIGS. 7–10. At process block 722, the root device and one or more embedded devices of the DOT object are registered with an event listener object 390. The event listener object is registered with the UPnP SDK 400 in order to receive action/event request from one or more control points of the UPnP device. At process block 724, the event listener object 390 receives an action event request, for example, from a control point 380. At process block 726, the action 392 is passed to a local callback function of the event listener object 380. Next, at process block 728, a service object table (SOT) 360 of the root device DOT object 330 is searched to find a service object based on a device ID and service ID. Once the service object is found, process block 730 is performed.

At process block 730, once the service object is determined, the service object callback function looks for an appropriate action method for execution in response to the incoming action event 392. Next, at process block 732 the action method is executed by parsing an input XML file in order to perform the action method in response to the action request. Once executed, at process block 734, an event object is provided with a response string, which is eventually provided to the control point 380. Finally, process blocks 724–734 are repeated until the device executable 450 is shutdown.

Class Libraries

The following describes one embodiment of the various classes and class functions utilized by the present invention. However, those skilled in the art will appreciate that the present invention is not limited to the following classes and functions. In addition, the following does not provide an exhaustive list of classes and functions to perform the teachings of the present invention.

| METHODS | DESCRIPTION |
| --- | --- |
| UDT Class Library | |
| GetScpdFileName | Retrieves service description file name (SCPD) from SCPD URL string. |
| GetDeviceName | Extract the device type parameter from urn string. |
| GetServiceName | Retrieves the service type parameter from urn string. |
| GetNextUniqName | Creates a unique name string. |
| RetrieveFileName | Separates out the filename from its path string. |
| AddSrcFile | Creates a complete file name by adding the current working directory in to it. |
| GetParentDir | Chops off the one level of leaf child directory from the path string. |
| ProcessDeviceNode | It parses a device node and generates code for all the services declared in it. |
| ProcessService | It parses the service node and generates service class files including service linking info. |
| CreateMakefile | Creates makefile for the Linux build. |
| SetProjectEnv | It setup a build environment for the generated source codes such as include, library project, etc. |
| SetupDir | This method prepares a list of source file that will participate in device build. |
| CreateDevice | This method parses the description document and sequences other method to create service class files and makefile required for the complete device. |
| DevDescriptionFile | File name for device description document. |
| SourceDir | Source directory name that contains all the input XML files. |
| RootWorkingDir | Complete directory name, where UDT started. |
| FileNameList | Source file list, generated by UdTool. |
| NumFile | Count of source files in the FileNameList. |
| LinkerObj | UdTool class passes the service information to this (CLinker) Class that finally generates ServiceLinker class. |

| METHOD | DESCRIPTION |
| --- | --- |
| CClassGenerator | |
| GetNodeValue | Retrieves the node value from description document. |
| GetLocalVarType | Returns a local variable type for the XML defined variable type. |
| GetParamType | Return a local parameter type for the action argument. |
| GetParamConvFn | Returns the conversion function name. This is used for converting the action formal parameter to its local argument type. |
| ParseVar | This method retrieves all the attribute value attached with the evented variable. |
| ParseAction | It parses each action node and fills the action list. |
| CreateActionList | Creates an action List. |
| LocateIncDir | It converts the absolute directory path to a relative path. |
| AddIncludeFileDecl | Adds include file declaration in the generated class file. |
| AddClassDecl | Adds class declaration in the class header file. |
| CreateHeaderFile | Generate header file |
| ImplementActionCallback | Generates code for callback function that processes all the incoming action for that service. |
| ImplementSubscriptionCallback | Generates code for callback function that processes subscription request for that service. |
| ImplementStateVarCallback | Generates code for callback function that processes state variable query request for that service. |

-continued

| | |
|---|---|
| CreateImplementationFile | Generate implementation file (CPP file). |
| AddServiceDescription | Initializes this class (CClassGenerator) object with the given service info. |
| GenerateServiceClass | Generates the complete service class including class file and its header file. |
| ServiceClassName | Class name for this service class. |
| SCPDFileName | SCPD file name for this service class. |
| StateVarList | Evented variable list. |
| NumStateVar | Number of state variable in the list. |
| ActionList | List of action, where each action is defined as name of the action with its parameter list. |

| METHODS | DESCRIPTION |
|---|---|
| CLinker | |
| GenerateLinkerDecl | Create header file for ServiceLinker class. |
| GenerateLinkerImpl | Create implementation file for ServiceLinker class. |
| AddService | Adds service information in the ServiceList. |
| GenerateServiceLinker | Create ServiceLinker class file. |
| ServiceList | Service Table. |
| NewNumService | Number of services in the ServiceList. |

| METHOD | DESCRIPTION |
|---|---|
| CUtil | |
| GetDocNodeValue | Retrieves the value of node from UPnP document node. |
| GetEleNodeValue | Retrieves the value of node from UPnP element node. |
| GetPort | Extract port number from device description document. |
| GetCurrentDirectory | The current working directory name for this process. |
| ChangeDirToParentDir | Current working directory is set to its parent directory. |
| SetCurrentDirectory | Process current working directory is changed to the value given in the input parameter. |
| CreateDirectory | Creates a new directory inside the current working directory. |
| CopyFile | Content of file source file is copied to the destination file. |
| CopyDir | Content of source directory is copied to destination directory. |

| METHOD | DESCRIPTION |
|---|---|
| UDCL CLASS LIBRARY<br>CrootService | |
| UpnpMakeResponse | Creates an action response packet. |
| GetDeviceId | Returns device UUID. |
| GetServiceId | Returns service ID |
| GetServiceType | Returns Service Type. |
| GetEvtUrl | Returns URL for subscription. |
| GetScpd | Returns service description file name. |
| GetCtrlUrl | Returns URL to send action. |
| GetNodeValue | Retrieves the value of the node “NodeName” from description document. |
| SendEvent | Send gena event to the subscribed client. |
| itoa | Convert integer to string value. |
| StrStr | Does string comparison after removing the space char from “DestStr” |
| ToUint | Convert string to unsigned int |
| ToUchar | Convert string to unsigned char |
| ToUshort | Convert string to unsigned short |
| ToInt | Convert string to integer |
| ToChar | Convert string to char |
| ToDouble | Convert string to double |
| ToShort | Convert string to short |
| ToFloat | Convert string to float |
| ToBool | Convert string to bool |
| ToString | Overloaded function that converts the different native data types to string. |
| CloneVar | CloneVar is a similar function like ToString ( ) but it returns a new copy of string that contains the value of the input variable. This function is also overloaded to accept value as different data types. |
| SetHandle | Sets the device handle |
| ServiceCallback | Interface callback function that will receive action request for ServiceLinker. |

-continued

| METHOD | DESCRIPTION |
|---|---|
| CEvent | |
| SetResp | After the service finishes executing the action, this method sets the action response in this class object. The same response packet is finally sent to the control point. |
| SetStateVariable | Sets the value of queried state variable. |
| GetStateVariable | Returns the value of queried state variable. |
| GetResp | Retrieves the response of the action sent by service. |
| SetErr | During action execution, service uses this function to return error. |
| GetErr | Retrieves error of the last action execution. |
| RespDoc | Stores the response of the action. |
| StVar | Used to store the value of queried state variable. |
| ErrStr | Stores error string of the last action execution. |

| METHODS | DESCRIPTION |
|---|---|
| CDevice | |
| GetNextDevice | Returns the next child embedded device in the device tree. |
| GetFirstService | Returns the first service from the device's service list. |
| GetDeviceId | Returns device UUID. |
| GetDeviceType | Returns device type. |
| GetFriendlyName | Returns friendly name. |
| GetManufacturer | Returns manufacturer information. |
| GetManufacturerUrl | Returns manufacturer URL. |
| GetModelDescription | Returns model description. |
| GetModelName | Returns model name. |
| GetModelNumber | Returns model number. |
| GetModelUrl | Returns model URL. |
| GetSerialNumber | Returns serial number. |
| GetUpc | Returns Upc. |
| ProcessDevice | Private method, process the device tree. |
| GenerateDeviceDescription | Creates device description file (DCP). |
| InsertDevice | Insert embedded device. |
| InsertService | Insert service. |
| SetProperties | Set device properties by copying info from some other device. |
| SetDeviceInfo | Set device Id and type information. |
| DelistService | Just remove service from the device tree. |
| RemoveService | Remove Service without deleting its object. |
| DeleteService | Remove Service by deleting its object. |
| DeviceCleanup | Delete all child sub-device and service. |

| METHOD | DESCRIPTION |
|---|---|
| CEventListener | |
| GetLocalHostname | Finds out the local IP address for default interface. |
| GetPortNo | Retrieves Port number from device description document. |
| GetNodeValue | Retrieves node value from XML document node. |
| ServiceCallback | Common service callback for action handling. |
| AcceptSubscription | Accepts subscription request for the subscribed client. |
| MainCallback | This method receives every action and event that is sent for the any services of device. This is a listener callback function registered with Intel's UPnP SDK. |
| GetService | Return instance of the service, identified by DevId and ServId. |
| SetDescription | Sets description file name for the device. |
| Listen | Start listening for the control point request (action or event). |
| ServiceManager | Stores instances of the service including device ID and service ID. |
| DescDocName | Device description file name. |
| DescDocPath | Location of Device description file. |
| DevHandle | This variable stores the device handle, returned after the registration with UPnP SDK. |

-continued

| METHOD | DESCRIPTION |
|---|---|
| CDeviceManager | |
| AddDeviceInRDT | Adds a device in the Root Device Table (RDT). |
| RemoveDeviceFromRDT | Removes a device from the Root Device Table (RDT). |
| DevHandle | Device registration handle that we get after registration with UPnP SDK. |
| DeviceList | List of all the root devices registered in UDCL. |
| DescDocPath | Location of description document (DCP). |
| UpnpDeviceIp | The IP address on which device is listening for the client request. |
| UpnpDevicePort | The port number on which device is listening for the client request. |
| StartDevice | Start a new root device. |
| StopDevice | Stop a registered root device. |
| FindDevice | Find a device based on its device ID. |

| METHOD | DESCRIPTION |
|---|---|
| CServiceManager | |
| AddService | Adds a new service in its Service Object Table (SOT). |
| RemoveService | Remove a registered service from its Service Object Table (SOT). |
| AddDeviceInSOT | Takes a device object as a parameter and add all the service found in this device tree. |
| RemoveDeviceFromSOT | Takes a device object as a parameter and removes all the service found in this device tree. |
| FindService | Returns a registered service object based on the device Id and Service Id. |
| ServiceList | List of registered services. It is also called Service Object Table. |

| METHOD | DESCRIPTION |
|---|---|
| CList | |
| AddNode | Adds a new node in to the linked list. |
| DeleteNode | Finds and deletes a node from the linked list. |
| RemoveNode | Deletes a node and free the memory for its member data. |
| NodeList | Head of the linked list. |
| DeleteNextNode | Deletes a node, next to the input node. |

| METHOD | DESCRIPTION |
|---|---|
| Application Common class CServiceLinker | |
| CServiceLinker | Does initialization kind of job. Creates a root device and register it with the UDCL. |
| ~CServiceLinker | Un-registers the root device and shutdown the UDCL. |
| CreateRootDevice | Creates an instance of a root device. |
| DevHandle | Device handle returned after registration with UDCL. |
| RootDev | Instances of root device stored in this member variable. |

ALTERNATE EMBODIMENTS

Several aspects of one implementation of an apparatus and method for providing UPnP device code generation have been described. However, various implementations of the UDTool and the UDCL provide numerous features including, complementing, supplementing, and/or replacing the features described above. Features can be implemented as part of one or more class libraries or as part of a single class library in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to UPnP device code generation, it will be appreciated by those skilled in the art that the teaching of the present invention can be applied to other systems. In fact, systems for actions or event based responses are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to provide a time and cost effective solution for developing UPnP devices. This process eliminates many stages of the software development cycle, and hence, effectively reduces the development time up to 75%. It also provides other hidden advantages, including uniform coding style, that will prove useful in understanding and maintaining the code. In addition, the present invention provides operating system independent code, which is tested and optimized. The universal device tool, as taught by the present invention, generates code on a pre-designed model of a UPnP device framework that eliminates a major portion of design time in a software development process. Most of the code generated by this tool is already tested. In addition, most of the UPnP core processing is performed by the universal device class library module, which is also tested and optimized. Accordingly, the present invention eliminates the cumbersome process resulting for traditional development of UPnP devices and allow the device developer to focus their attention on application-specific problems instead of worrying about UPnP.

Having disclosed exemplary embodiments and the best mode, modifications and variations may be made to the disclosed embodiments while remaining within the scope of the invention as defined by the following claims.

What is claimed is:

1. A computer implemented method comprising:

generating one or more service control class files including one or more service control stub-methods according to a UPnP device description document received from a device vendor;

receiving the service control class files including the service control stub-methods updated by the device vendor for responding to actions and events received by a UPnP device described by the UPnP device description document; and compiling the service control class files and the updated service control stub-methods along with a device class library and a UPnP software development kit to generate a UPnP device executable to provide an implementation of a UPnP network protocol for the UPnP device described by the UPnP device description document.

2. The computer implemented method of claim 1, wherein generating the service control class files further comprises:

parsing the UPnP device description document to determine a root device including one or more services and one or more embedded devices each including one or more services, each service defined by a service control protocol description (SCPD) file;

generating a service control class file for each of the one or more services of the root device;

selecting an embedded device from the one or more embedded devices of the root device;

generating a service control class file for each of the one or more services of the selected embedded device;

repeating the generating and selecting for each of the one or more embedded devices of the root device; and once each of the service control class files are generated, generating a class service linker file based on the generated service control class files, the class service file linker enabling linking the service control class files during compiling to generate the device executable.

3. The computer implemented method of claim 2, further comprising:

generating a root directory for the root device;

storing each of the one or more services of the root device within the root directory;

selecting an embedded device from the one or more embedded devices of the root device;

generating a sub-root directory for the selected embedded device;

storing each of the one or more services of the selected embedded device within the sub-root directory; and repeating generating and storing for each of the one or more embedded devices of the root device.

4. The computer implemented method of claim 2, wherein generating service control class files for the root device further comprises:

selecting a service from the one or more services of the root device;

generating a class generator object for the selected service of the root device;

passing an SCPD file describing the selected service, including a device identification code of the root device and a service identification of the selected service to the class generator object;

generating, by the class generator object, a service control class file based on the received SCPD file, the service identification code and the device identification code;

generating a header file corresponding to the generated service control class file and the SCPD file;

once generated, destroying the class generator object; and repeating the selecting, generating, passing, generating and destroying for each of the one or more services of the root device.

5. The computer implemented method of claim 2, wherein generating service control class files for the selected embedded device further comprises:

selecting a service from the one or more services of the selected embedded device;

generating a class generator object for the selected service of the selected embedded device;

passing an SCPD file describing the selected service, including a device identification code of the selected embedded device and a service identification code of the selected service to the class generator object;

generating, by the class generator object, a service control class file based on the received SCPD file, the service identification code and the device identification code;

generating a header file corresponding to the generated service control class file and the SCPD file;

once generated, destroying the class generator object; and repeating the selecting, generating, passing, generating and destroying for each of the one or more services of the selected embedded device.

6. The computer implemented method of claim 2, wherein generating the service linker class file further comprises:

generating a class service linker object;

storing class information regarding each generated service control class file within a service table of the class service linker object;

generating, by the class service linker object, the class service linker file based on the service table; and destroying the class service linker object.

7. The computer implemented method of claim 1, wherein receiving the service control class files further comprises:

displaying the one or more service control stub-methods to the device vendor;

receiving code from the device vendor for implementing the one or more service control stub-methods for responding to actions and events received by the UPnP device; and once the code is received, storing the received code within the one or more corresponding service control stub-methods.

8. The computer implemented method of claim 1, further comprising:

executing the device executable;

creating an instance of the root device and each of the one or more services of the root device;

creating an instance of each embedded device and each of the one or more services of the respective embedded device;

organizing the root device and embedded devices, as well as the services of the root device and the embedded devices within a tree hierarchy based on the device description document to form a device object tree; and registering the root device and the one or more embedded device within the device object tree with the device class library to enable receipt of events for the services of the root device and the services of the one or more registered embedding devices.

9. The computer implemented method of claim 8, wherein registering the root device and one or more embedded devices further comprises:

registering an event listener object of the device class library with the UPnP software development kit to enable receipt of action and event requests received/generated by one or more control points of the UPnP device;

registering the root device and one or more embedded devices with the event listener object;

receiving, by the event listener object, a respective action/event request from a control point;

finding a service object for response to the respective action request using a received device identification code and service identification code;

once the service object is found, invoking a callback function of the service object to determine an appropriate action method to execute in response to the respective action request;

executing the appropriate action method; and once the action method is processed, setting an event object with a response string that is received by the control point.

10. A computer readable storage medium including program instructions that direct a computer to function in a specified manner when executed by a processor, the program instructions comprising:

generating one or more service control class files including one or more service control stub-method according to a UPnP device description document received from a device vendor;

receiving the service control class files including the service control stub-methods updated by the device vendor for responding to actions and events received by a UPnP device described by the UPnP device description document; and compiling the service control class files and the updated service control stub-methods along with a device class library and a UPnP software development kit to generate a UPnP device executable to provide an implementation of a UPnP network protocol for the UPnP device.

11. The computer readable storage medium of claim 10, wherein generating the service control class files further comprises:

parsing the UPnP device description document to determine a root device including one or more services and one or more embedded device each including one or more services, each service defined by a service control protocol description (SCPD) file;

generating a service control class file for each of the one or more services of the root device;

selecting an embedded device from the one or more embedded devices of the root device;

generating a service control class file for each of the one or more services of the selected embedded device;

repeating the generating and selecting for each of the one or more embedded devices of the root device; and once each of the service control class files are generated, generating a class service linker class file based on the generated service control class files, the class service linker file enabling linking the service control class files during compiling to generate the device executable.

12. The computer readable storage medium of claim 11, further comprising:

generating a root directory for the root device;

storing each of the one or more services of the root device within the root directory;

selecting an embedded device from the one or more embedded devices of the root device;

generating a sub-root directory for the selected embedded device;

storing each of the one or more services of the selected embedded device within the sub-root directory; and repeating generating and storing for each of the one or more embedded devices of the root device.

13. The computer readable storage medium of claim 11, wherein generating service control class files for the root device further comprises:

selecting a service from the one or more services of the root device;

generating a class generator object for the selected service of the root device;

passing an SCPD file describing the selected service, including a device identification code of the root device and a service identification of the selected service to the class generator object;

generating, by the class generator object, a service control class file based on the received SCPD file, the service identification code and the device identification code;

generating a header file corresponding to the generated service control class file and the SCPD file;

once generated, destroying the class generator object; and repeating the selecting, generating, passing, generating and destroying for each of the one or more services of the root device.

14. The computer readable storage medium of claim 11, wherein generating service control class files for the selected embedded device further comprises:

selecting a service from the one or more services of the selected embedded device;

generating a class generator object for the selected service of the selected embedded device;

passing an SCPD file describing the selected service, including a device identification code of the selected embedded device and a service identification code of the selected service to the class generator object;

generating, by the class generator object, a service control class file based on the received SCPD file, the service identification and the device identification;

generating a header file corresponding to the generated service control class file and the SCPD file;

once generated, destroying the class generator object; and repeating the selecting, generating, passing, generating and destroying for each of the one or more services of the selected embedded device.

15. The computer readable storage medium of claim 11, wherein generating the service linker class file further comprises:

generating a class service linker object;

storing class information regarding each generated service control class file within a service table of the class service linker object;

generating, by the class service linker object, the service class linker file based on the service table; and destroying the class service linker object.

16. The computer readable storage medium of claim 10, wherein receiving the service control class files further comprises:

displaying the one or more service control stub-methods to the device vendor;

receiving code from the device vendor for implementing the one or more service control stub-methods for responding to actions and events received by the UPnP device; and once the code is received, storing the received code within the one or more corresponding service control stub-methods.

17. The computer readable storage medium of claim 10, further comprises:

executing the device executable;

creating an instance of the root device and each of the one or more services of the root device;

creating an instance of each embedded device and each of the one or more services of the respective embedded device;

organizing the root device and embedded devices, as well as the services of the root device and the embedded devices within a tree hierarchy based on the device description document to form a device object tree; and registering the root device and one or more embedded devices of the device object tree with the device class library to enable receipt of actions/events for the one or more services of the root device and the one or more services of the one or more registered embedded devices.

18. The computer readable storage medium of claim 17, wherein registering the root device and one or more embedded devices further comprises:

registering an event listener object of the device class library with the UPnP software development kit to enable receipt of action and event requests received/generated by one or more control points of the UPnP device;

registering the root device and one or more embedded devices with the event listener object;

receiving, by the event listener object, a respective action/event request from a control point;

finding a service object for response to the respective action request using a received device identification code and service identification code;

once the service object is found, invoking a callback function of the service object to determine an appropriate action method to execute in response to the respective action request;

executing the appropriate action method; and once the action method is processed, setting an event object with a response string that is received by the control point.

19. A system, comprising:

a processor having circuitry to execute instructions;

a communications interface coupled to the processor, the communications interface to advertise services to a control point, provide device description to the control point, provide service description for each service to the control point, to receive action/event requests from the control point and to publish updates during state changes in response to received action/event requests; and a storage device coupled to the processor, having sequences of instructions stored therein, which when executed by the processor cause the processor to:

receive service control class files including service control stub-methods updated by a device vendor for responding to actions and events received by a UPnP device described by a UPnP device description document, compile the service control class files and the updated service control stub-methods along with a device class library and a UPnP software development kit to generate a UPnP device executable to provide an implementation of a UPnP network protocol for the UPnP device described by the UPnP device description document, and execute the UPnP device executable to enable response to actions/events received by the UPnP device.

20. The system of claim 19, wherein the instruction to execute the device executable further causes the processor to:

create an instance of a root device and each of one or more services of the root device;

create an instance of each embedded device of the root device and each of one or more services of a respective embedded device;

organize the root device and embedded devices, as well as the services of the root device and the embedded devices within a tree hierarchy based on the device description document to form a device object tree;

register the device object tree with the device class library to enable receipt of actions/events for the services or the root device and the service, of the embedded devices; and register an event listener class of the device class library with the UPnP software developing kit to receive action/event requests from one or more control points of the UPnP device that are forwarded to service objects within the device object tree.

21. The system of claim 19, comprising:

one or more root devices, each including one or more services for responding to actions and events received by the respective root device, and one or more embedded devices including one or more services to respond to actions and events received by a respective embedded device.

22. The system of claim 20, wherein the processor is further caused to:

receive the UPnP device description document from the device vendor, generate one or more service control class files including one or more service control stub-methods based on the UPnP device description document and one or more service control protocol description files listed within the UPnP device description document, and provide the service control class files including service control stub-methods to the device developer in order to receive updated service control stub-methods including code for responding to actions and events received by a UPnP device described by the UPnP device description document.

23. A computer implemented method comprising:

generating at least one service control class file including at least one service control stub-method according to a UPnP description document received from a device vendor, and generating a UPnP device executable for a UPnP device described by the UPnP description document, wherein the device executable to provide an implementation of a UPnP network protocol for the UPnP device.

24. The computer implemented method of claim 23 wherein generating the device executable further comprises:

receiving the service control class files including the service control stub-methods updated by the device vendor for responding to actions and events received by the UPnP device described by the UPnP device description document; and compiling the service control class files and the updated service control stub-methods along with a device class library and a UPnP software development kit to generate the UPnP device executable.

25. The computer implemented method of claim 23, wherein generating the service control class file further comprises:

displaying the service control stub-method to the device vendor;

receiving code from the device vendor for implementing the service control stub-method for responding to actions and events received by the UPnP device; and scoring the code received from the device vendor within the service control stub-method.

26. A computer implemented method comprising:

displaying, to a device vendor, at least one service control stub-method of at least one service control class file generated according to a UPnP device description document received from the device vendor; and compiling the service control class files and the service control stub-methods updated by the device vendor along with a device class library and a UPnP software development kit to generate a UPnP device executable to provide an implementation of a UPnP network protocol for the UPnP device.

27. The computer implemented method of claim 26, wherein displaying the at least one service control stub-method further comprises:

receiving code from the device vendor for implementing the service control stub-method for responding to actions and events received by the UPnP device; and storing the updated code received from the device vendor within the service control stub-method.

28. The computer implemented method of claim 26, wherein display further comprises:

receiving the UPnP device description document from the device developer; and generating one or more service control class files including one or more service control stub-methods according to the UPnP device description document received from the device vendor.

* * * * *

UNITED STATES PATENT AND TRADEMARK OFFICE

CERTIFICATE OF CORRECTION

PATENT NO. : 7,017,148 B2
APPLICATION NO. : 09/903019
DATED : March 21, 2006
INVENTOR(S) : Kumar It is certified that error appears in the above-identified patent and that said Letters Patent is hereby corrected as shown below:

In column 11, at line 33, delete "UTnP" and insert --UPnP--.

Signed and Sealed this

Twenty-seventh Day of November, 2007

JON W. DUDAS
*Director of the United States Patent and Trademark Office*